US010786726B2

(12) United States Patent
Doerksen et al.

(10) Patent No.: US 10,786,726 B2
(45) Date of Patent: Sep. 29, 2020

(54) SELF-STABILIZING SKATEBOARD

(71) Applicant: Future Motion, Inc., Santa Cruz, CA (US)

(72) Inventors: Kyle Jonathan Doerksen, Santa Cruz, CA (US); Beau Robertson, Santa Cruz, CA (US); Daniel J. Wood, Camas, WA (US); Julian De La Rua, Santa Cruz, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 16/664,977

(22) Filed: Oct. 28, 2019

(65) Prior Publication Data
US 2020/0254327 A1 Aug. 13, 2020

Related U.S. Application Data

(63) Continuation of application No. 16/298,274, filed on Mar. 11, 2019, now Pat. No. 10,456,658.
(Continued)

(51) Int. Cl.
*A63C 5/08* (2006.01)
*A63C 17/12* (2006.01)
(Continued)

(52) U.S. Cl.
CPC ............ *A63C 17/12* (2013.01); *A63C 17/016* (2013.01); *A63C 17/08* (2013.01); *G01C 19/42* (2013.01);
(Continued)

(58) Field of Classification Search
CPC ....... A63C 17/12; A63C 17/08; A63C 17/016; A63C 17/00; A63C 17/01; A63C 17/04;
(Continued)

(56) References Cited

U.S. PATENT DOCUMENTS

| 4,134,599 A | 1/1979 | DiMille |
| 4,757,248 A | 7/1988 | Fujioka et al. |
| (Continued) | | |

FOREIGN PATENT DOCUMENTS

| KR | 10-2016-0088856 A | 7/2016 |
| KR | 10-1663781 B1 | 10/2016 |
| WO | 2017/053443 A1 | 3/2017 |

OTHER PUBLICATIONS

U.S. Receiving Office, International Search Report and Written Opinion of the International Searching Authority, dated Feb. 12, 2019, in PCT/US2018/063692.
(Continued)

*Primary Examiner* — James M Dolak
(74) *Attorney, Agent, or Firm* — Kolitch Romano LLP

(57) ABSTRACT

A self-stabilizing, one-wheeled electric skateboard may include improved features. In some examples, the vehicle includes a status indicator viewable through a slot formed in an upper surface of the board. In some examples, the vehicle includes a convertible carrying handle transitionable between stowed and deployed positions. In some examples, the vehicle includes an interchangeable fender and fender substitute that may be removably coupled to an upper surface of the board. In some examples, a motor controller of the vehicle may operate a field-oriented control (FOC) scheme configured to control the electric motor by manipulating a direct current aligned with a rotating rotor flux angle and a quadrature current defined at ninety degrees from the rotating rotor flux angle. In some examples, the motor controller may be configured to permit intuitive dismounting of the vehicle by tilting and/or moving the vehicle backward.

20 Claims, 30 Drawing Sheets

Related U.S. Application Data

(60) Provisional application No. 62/804,021, filed on Feb. 11, 2019.

(51) Int. Cl.
   *G05D 1/08* (2006.01)
   *G01C 19/42* (2006.01)
   *A63C 17/01* (2006.01)
   *A63C 17/08* (2006.01)

(52) U.S. Cl.
   CPC ........ *G05D 1/0891* (2013.01); *A63C 2203/12* (2013.01); *A63C 2203/14* (2013.01); *A63C 2203/52* (2013.01)

(58) Field of Classification Search
   CPC . A63C 17/06; A63C 2203/10; A63C 2203/12; A63C 2203/14; A63C 2203/52; A63C 2203/24; G05D 1/0891; G05D 1/0268; G05D 1/08; G05D 1/021; G05D 1/02; G05D 1/00; G01C 19/00; G01C 19/02; G01C 19/42; B62K 11/00; B62K 11/007; B62K 11/14; B62K 11/02
   See application file for complete search history.

(56) References Cited

U.S. PATENT DOCUMENTS

| | | | | |
|---|---|---|---|---|
| 5,119,277 A | * | 6/1992 | Copley | A63C 17/26 280/87.042 |
| 8,469,569 B1 | * | 6/2013 | Tunnicliffe | A63C 17/015 280/87.042 |
| 9,101,817 B2 | | 8/2015 | Doerksen | |
| 9,122,470 B2 | | 9/2015 | Yen | |
| 9,344,026 B2 | | 5/2016 | Tang | |
| 9,943,749 B2 | * | 4/2018 | Cerboneschi | A63C 17/12 |
| 9,956,474 B2 | * | 5/2018 | Zhou | B60K 1/04 |
| 10,167,036 B2 | * | 1/2019 | Ying | B62D 51/02 |
| 10,207,764 B2 | * | 2/2019 | Li | B62K 11/14 |
| 10,307,659 B2 | * | 6/2019 | Bigler | A63C 17/014 |
| 10,392,075 B2 | * | 8/2019 | Otsuki | B62K 23/08 |
| 10,398,962 B2 | * | 9/2019 | Rautiainen | B60L 50/66 |
| 10,399,457 B2 | * | 9/2019 | Doerksen | B62K 11/007 |
| 10,456,658 B1 | * | 10/2019 | Doerksen | G05D 1/0891 |
| 10,576,359 B2 | * | 3/2020 | Chiu | A63C 17/12 |
| 10,661,153 B2 | * | 5/2020 | Ma | A63C 17/12 |
| 2007/0194558 A1 | * | 8/2007 | Stone | A63C 17/26 280/601 |
| 2013/0175943 A1 | * | 7/2013 | Tackett | G09G 5/363 315/250 |
| 2016/0059109 A1 | * | 3/2016 | Bigler | B60L 15/20 180/181 |
| 2016/0121198 A1 | | 5/2016 | Doerksen et al. | |

OTHER PUBLICATIONS

Korean Intellectual Property Office, International Search Report and Written Opinion of the International Searching Authority, dated Jun. 11, 2020, in PCT/US2020/015724, which is the international application which shares the same priority as this U.S. application.

* cited by examiner

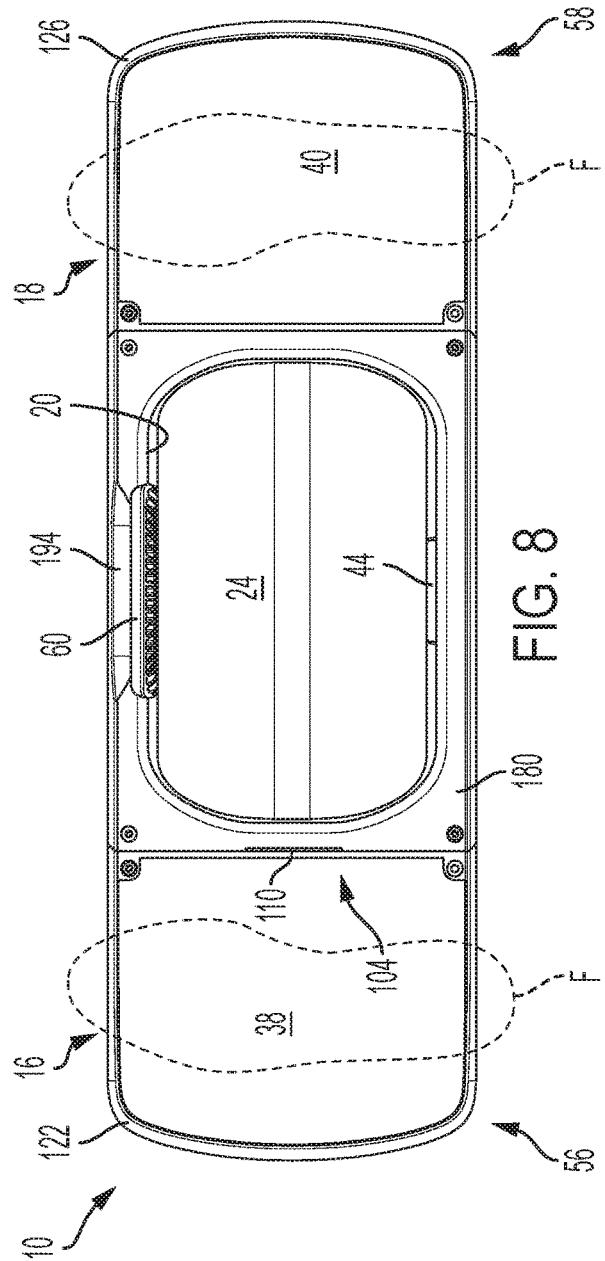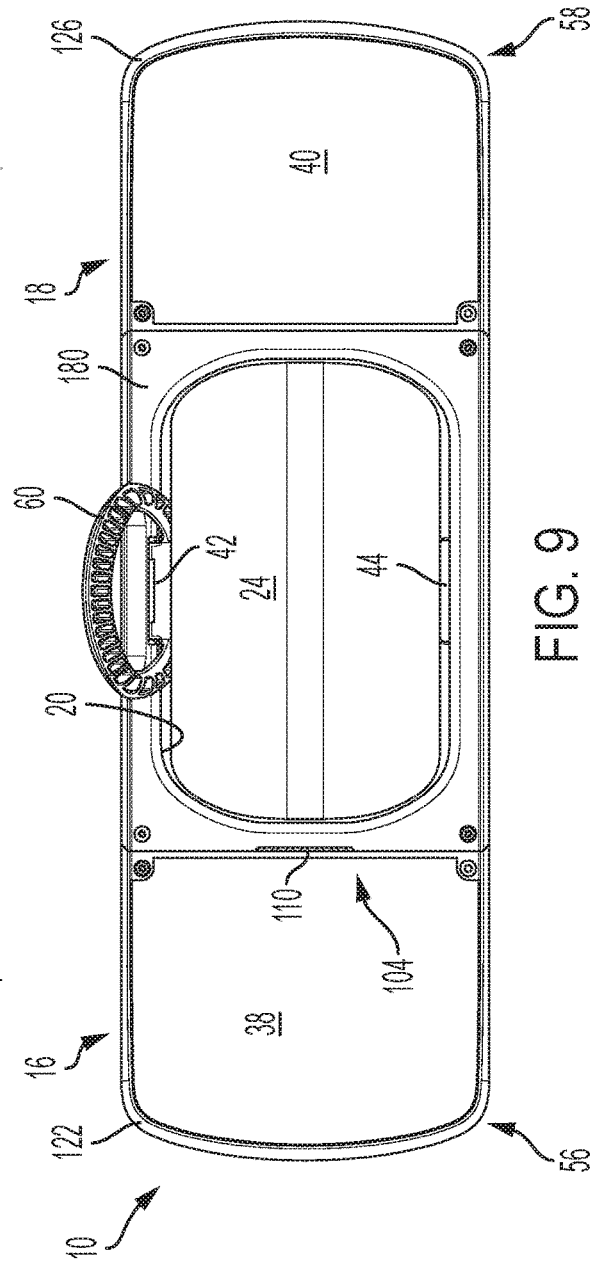

314

SELF-STABILIZING SKATEBOARD

CROSS-REFERENCES

This application claims the benefit under 35 U.S.C. § 119(e) of the priority of U.S. Provisional Patent Application Ser. No. 62/804,021, filed Feb. 11, 2019, the entirety of which is hereby incorporated by reference for all purposes.

The following related applications and materials are incorporated herein, in their entireties, for all purposes: U.S. Pat. Nos. 9,101,817, 9,452,345.

FIELD

This disclosure relates to self-stabilizing electric vehicles. More specifically, the disclosed embodiments relate to self-stabilizing tiltable skateboards having improved indicators and control systems.

SUMMARY

The present disclosure provides systems, apparatuses, and methods relating to self-stabilizing skateboards having improved control systems and indicators. In some embodiments, a self-balancing electric vehicle may include: one or more wheels having a common axis of rotation; a board having a first end and a second end, wherein the board is tiltable about the axis of the one or more wheels; an electric hub motor coupled to a power supply and configured to drive the one or more wheels; a motor controller configured to receive orientation information indicating an orientation of the board and to cause the hub motor to propel the board based on the orientation information; and a status indicator including a plurality of illuminators viewable through a slot in an upper surface of the board.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 8 is a top plan view of the skateboard of FIG. 1, showing a handle of the vehicle in a stowed configuration.

FIG. 9 is a top plan view of the skateboard of FIG. 1, showing the handle in a deployed or carrying configuration.

DETAILED DESCRIPTION

Figure 1:
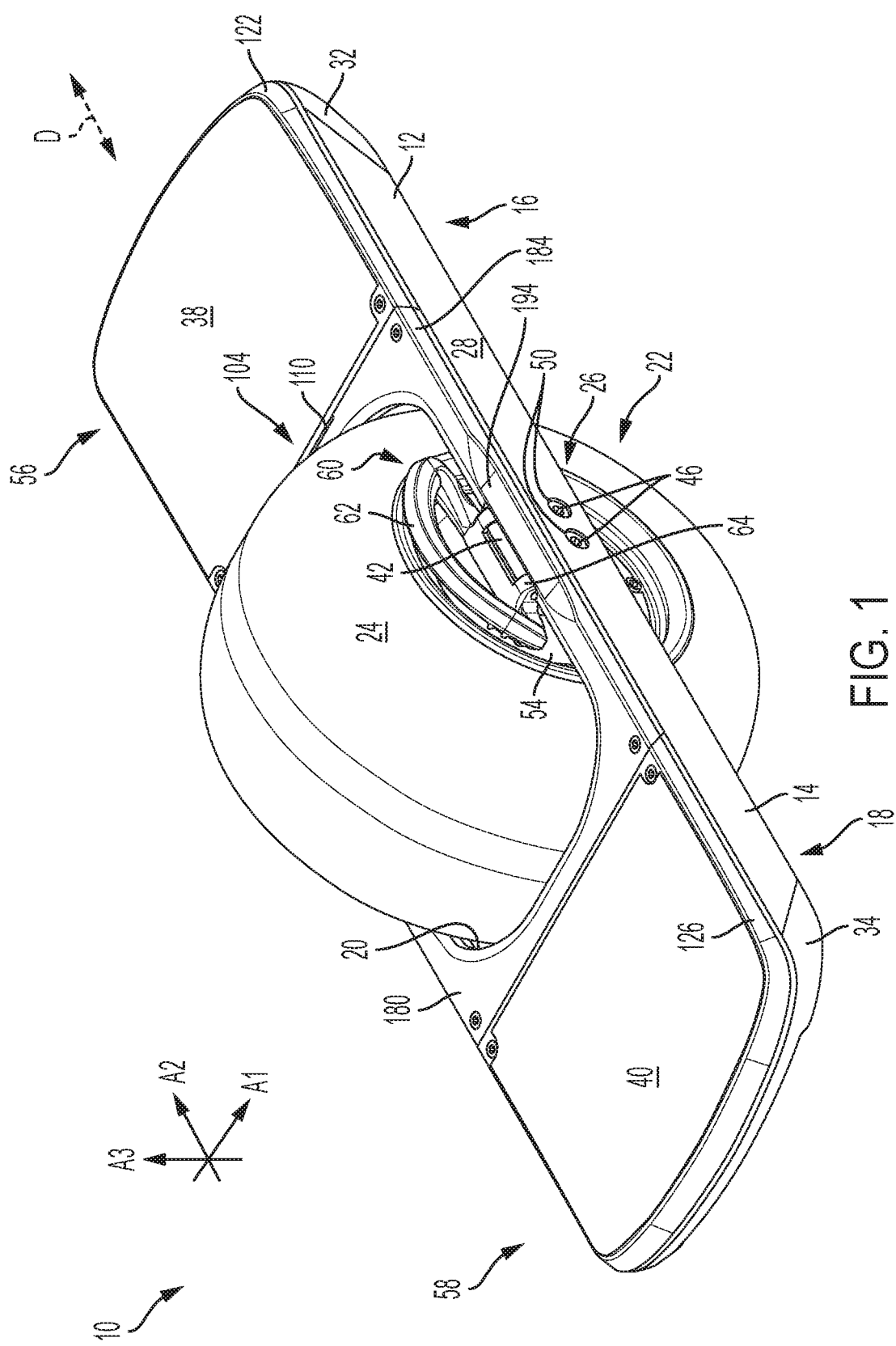
FIG. 1 is an isometric view of an illustrative one-wheeled skateboard in accordance with aspects of the present disclosure.

Various aspects and examples of a self-stabilizing skateboard having improved rider experience and control systems, as well as related methods, are described below and illustrated in the associated drawings. Unless otherwise specified, a self-stabilizing skateboard in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through E, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a host vehicle on which systems described herein may be incorporated, mounted, or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

Overview

In general, a self-balancing skateboard in accordance with the present teachings may include a board having a two deck portions on either side of a central opening. In the main example described below, each deck portion is configured to support a respective foot of a user oriented as on a standard skateboard, such that the vehicle is ridden with the user facing approximately ninety degrees to the direction of travel. In the central opening, a single wheel (or side-by-side wheels) is supported on an axle and driven by a motor (e.g., a hub motor). The board is therefore tiltable about the axis of the wheel (i.e., on the axle). An onboard electronic controller is configured to receive orientation information indicating an orientation of the board. In response to this orientation information, the controller causes the hub motor to propel the board and provides a self-stabilizing feature.

In some examples, the skateboard includes a handle pivotably coupled to a portion of the board, such as to an axle mounting block of the board. The handle can be pivoted between a stowed configuration and a deployed configuration. In the stowed configuration, the handle is flipped up (or in some examples down) adjacent the hub motor. In the deployed configuration, the handle is pivoted down (or up) to extend away from the hub motor and provide a graspable carrying handle for the user.

In some examples, the vehicle has a fender, which is interchangeable with a substitute "fender delete," which covers the connection points of the fender to the vehicle but does not extend to cover the vehicle wheel. The fender is removably coupled to a frame of the board and spans the opening between the deck portions. The fender has an arched portion covering an upper surface of the tire and a peripheral flange extending around the opening. The fender delete has a similar appearance, without the arched portion. In other words, it surrounds the periphery of the opening but does not overarch the tire or wheel.

In some examples, the vehicle includes a status indicator (e.g., a battery charge indicator) including a plurality of illuminators viewable through a slot formed in an upper surface of the board. This enables easy viewing for the rider.

In some examples, the vehicle has a motor controller using a field-oriented control (FOC) scheme configured to control the electric motor by manipulating a direct current aligned with a rotating rotor flux angle and a quadrature current defined at ninety degrees from the rotating rotor flux angle. Manipulation of the direct current is independent of manipulation of the quadrature current, and the motor controller includes processing logic configured to determine whether a counter electromotive force (CEMF) of the electric motor exceeds a voltage of the power supply by comparing a bus voltage of the power supply to a voltage threshold, and in response to the bus voltage being greater than the voltage threshold, weakening a motor flux of the electric motor and reducing the CEMF by automatically increasing the direct current.

Aspects of the control systems described herein may be embodied as a computer method, computer system, or computer program product. Accordingly, aspects of the present control systems may include processing logic and may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the present control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary self-balancing vehicles, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electric Vehicle

Figure 11:
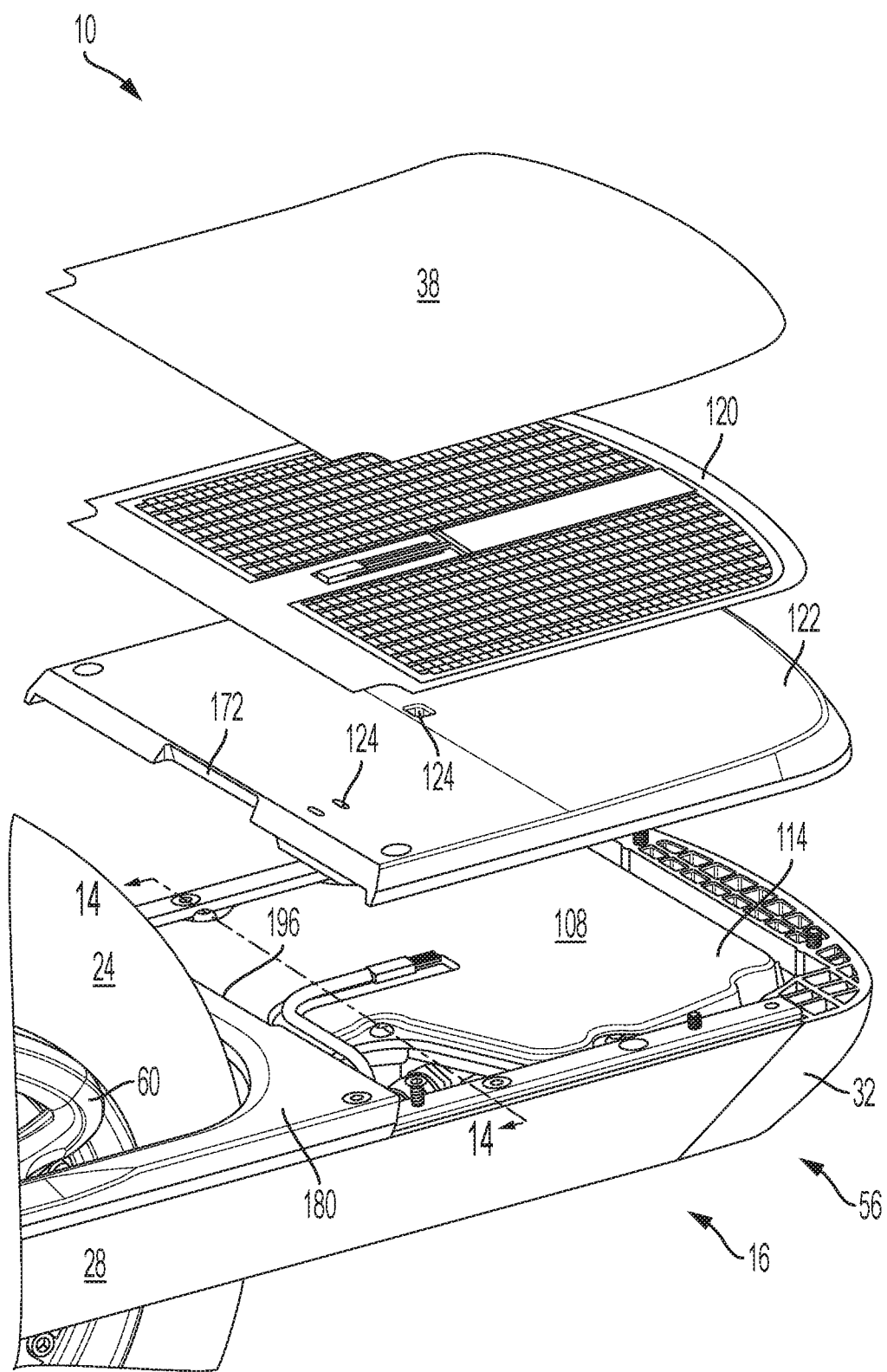
FIG. 11 is a partially exploded, isometric view of a first deck portion of the skateboard of FIG. 1.
Figure 12:
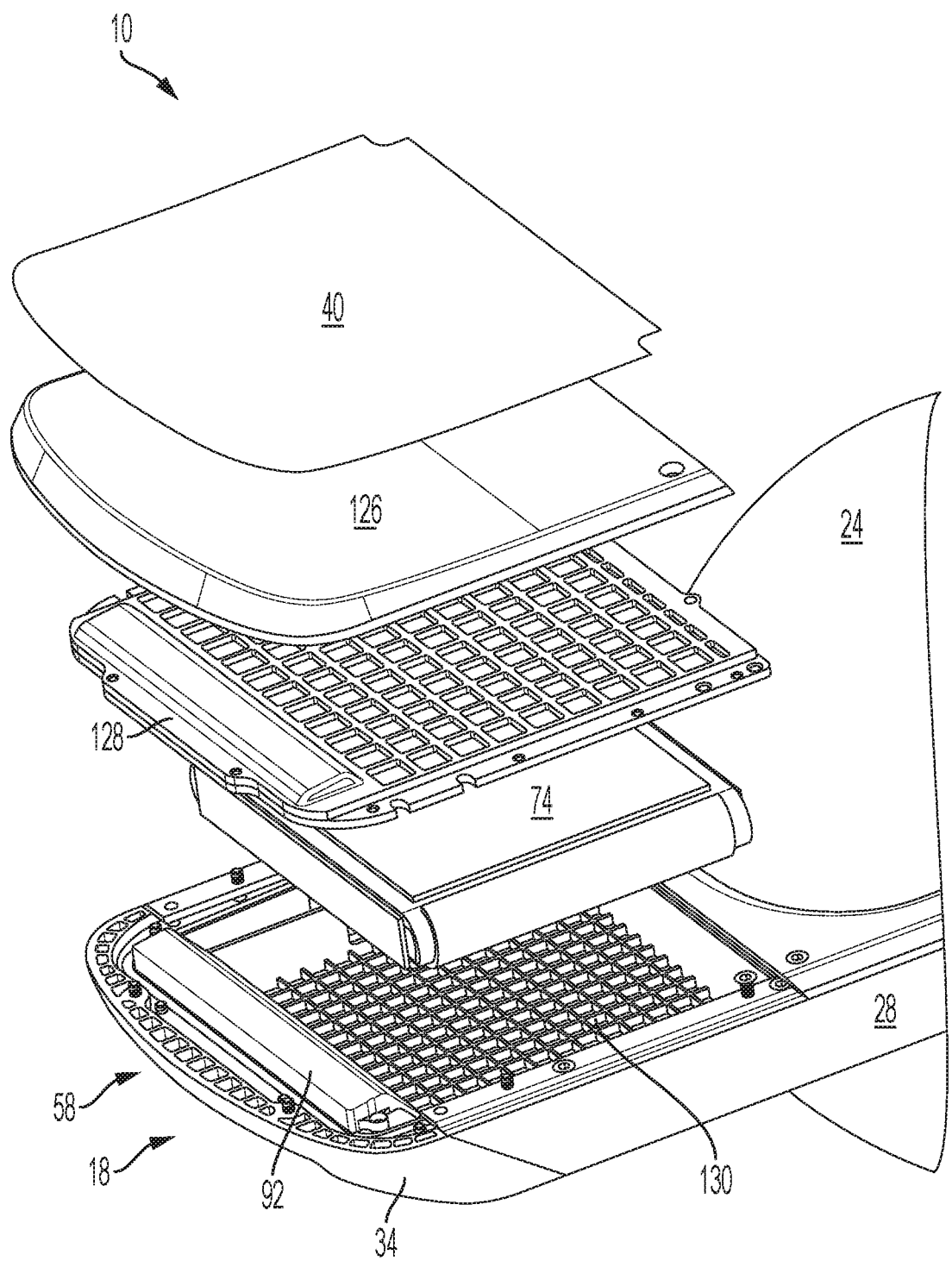
FIG. 12 is a partially exploded, isometric view of a second deck portion of the skateboard of FIG. 1.
Figure 13:
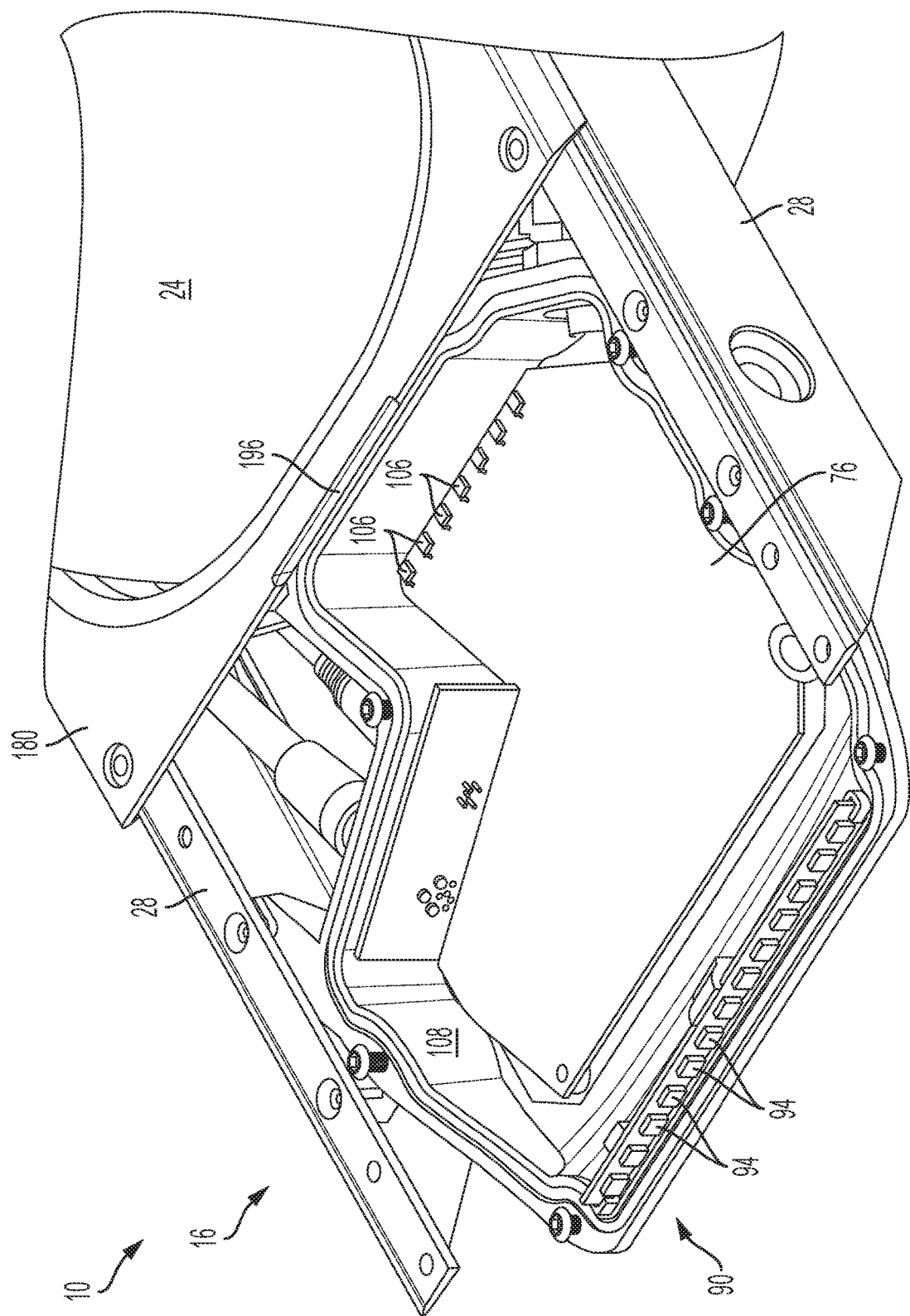
FIG. 13 is an isometric view of the first deck portion of the skateboard of FIG. 1, with selected features removed to show underlying components.
Figure 14:
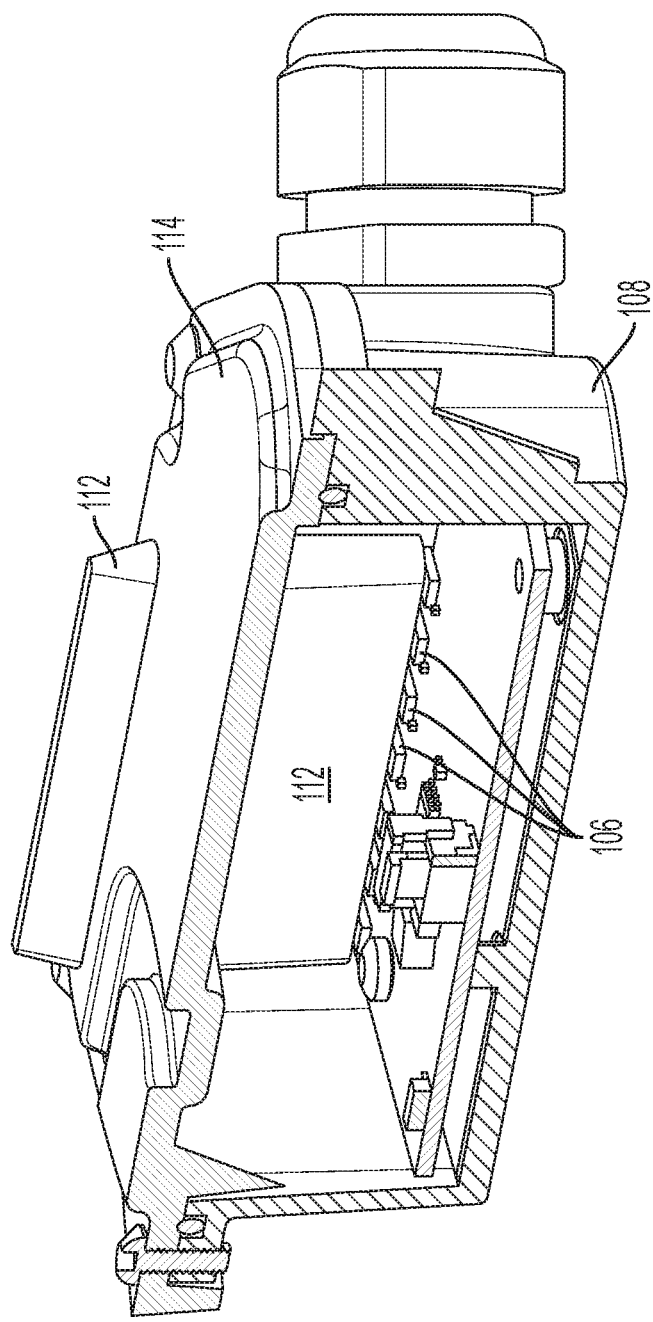
FIG. 14 is an isometric sectional view of a controller of the skateboard of FIG. 1, taken at line 14-14 of FIG. 11.
Figure 15:
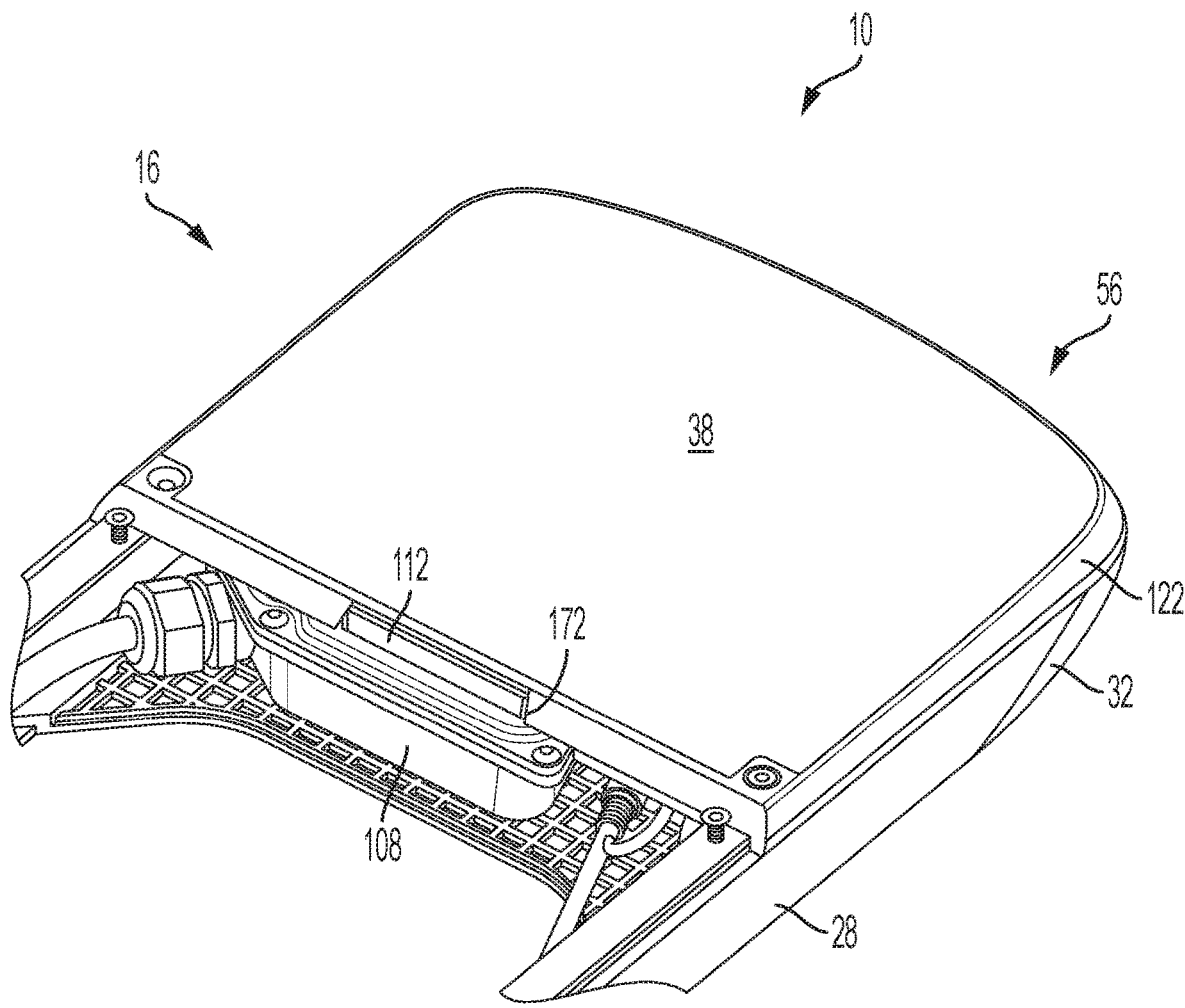
FIG. 15 is a partial isometric view of the first deck portion of the skateboard of FIG. 1 with selected components removed to show an open inner end.
Figure 16:
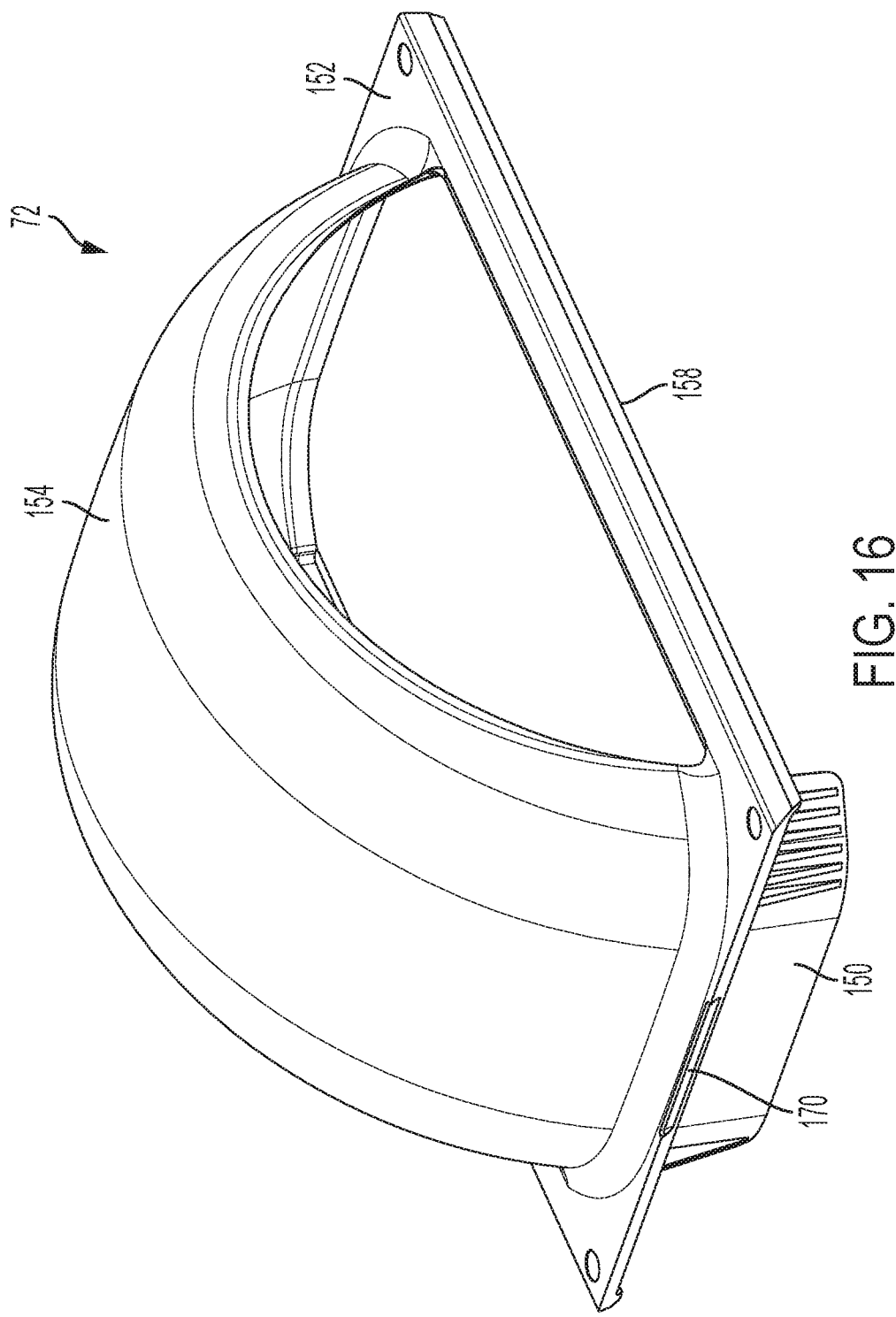
FIG. 16 is an isometric view of an illustrative fender suitable for use with the skateboard of FIG. 1.
Figure 17:
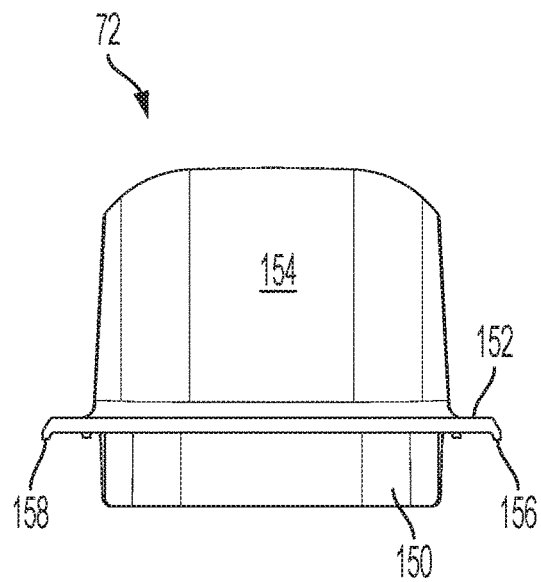
FIG. 17 is an end elevation view of the fender of FIG. 16.
Figure 18:
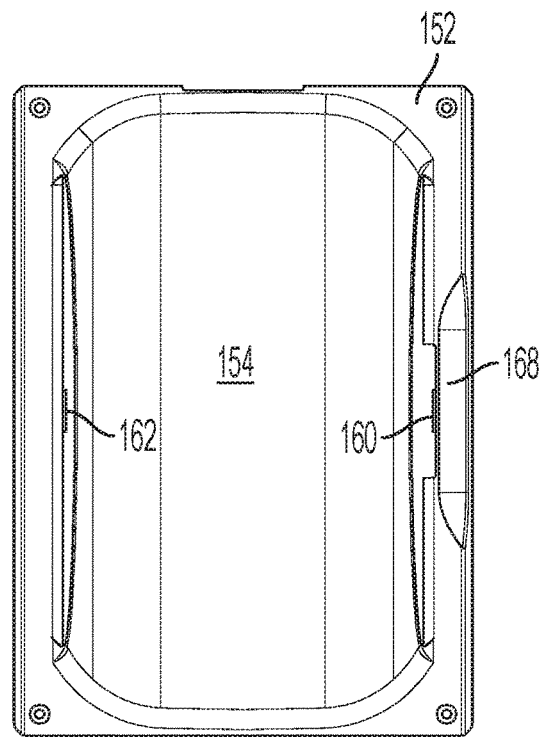
FIG. 18 is a top plan view of the fender of FIG. 16.
Figure 19:
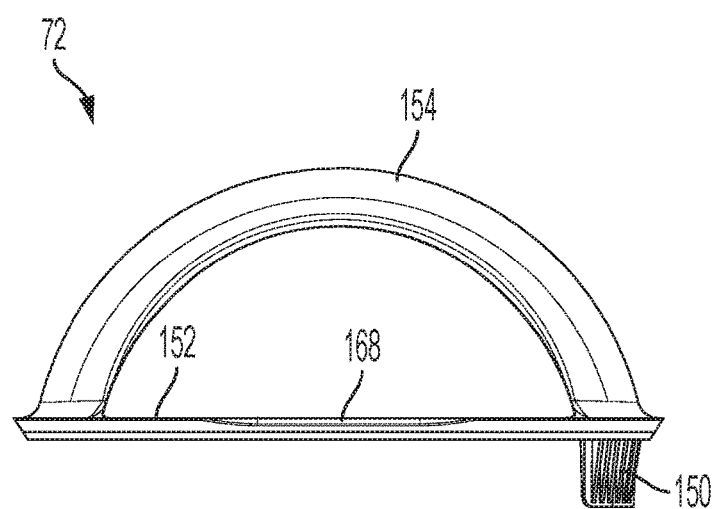
FIG. 19 is a side elevation view of the fender of FIG. 16.
Figure 20:
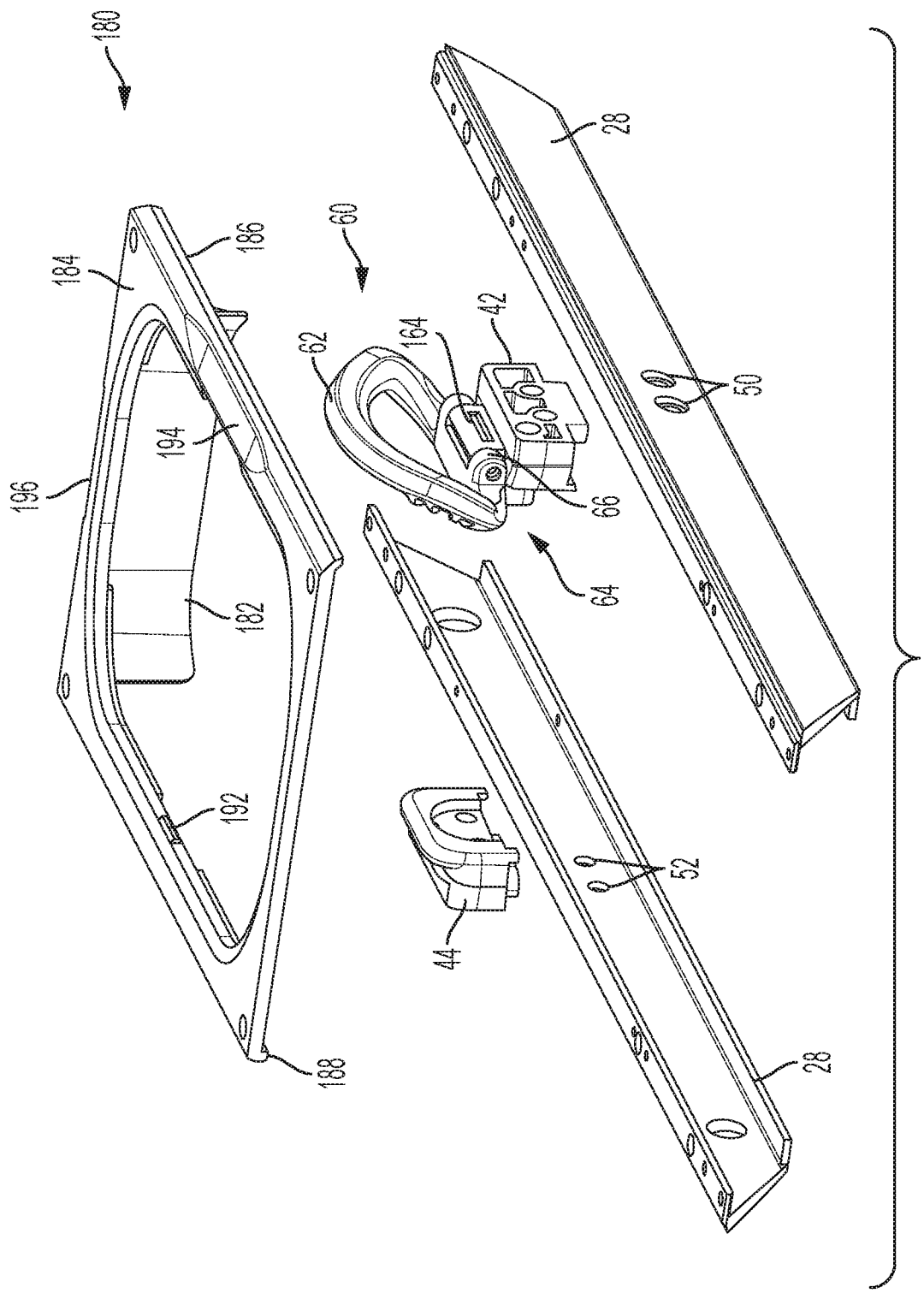
FIG. 20 is a first isometric exploded view depicting selected components of the skateboard of FIG. 1.
Figure 21:
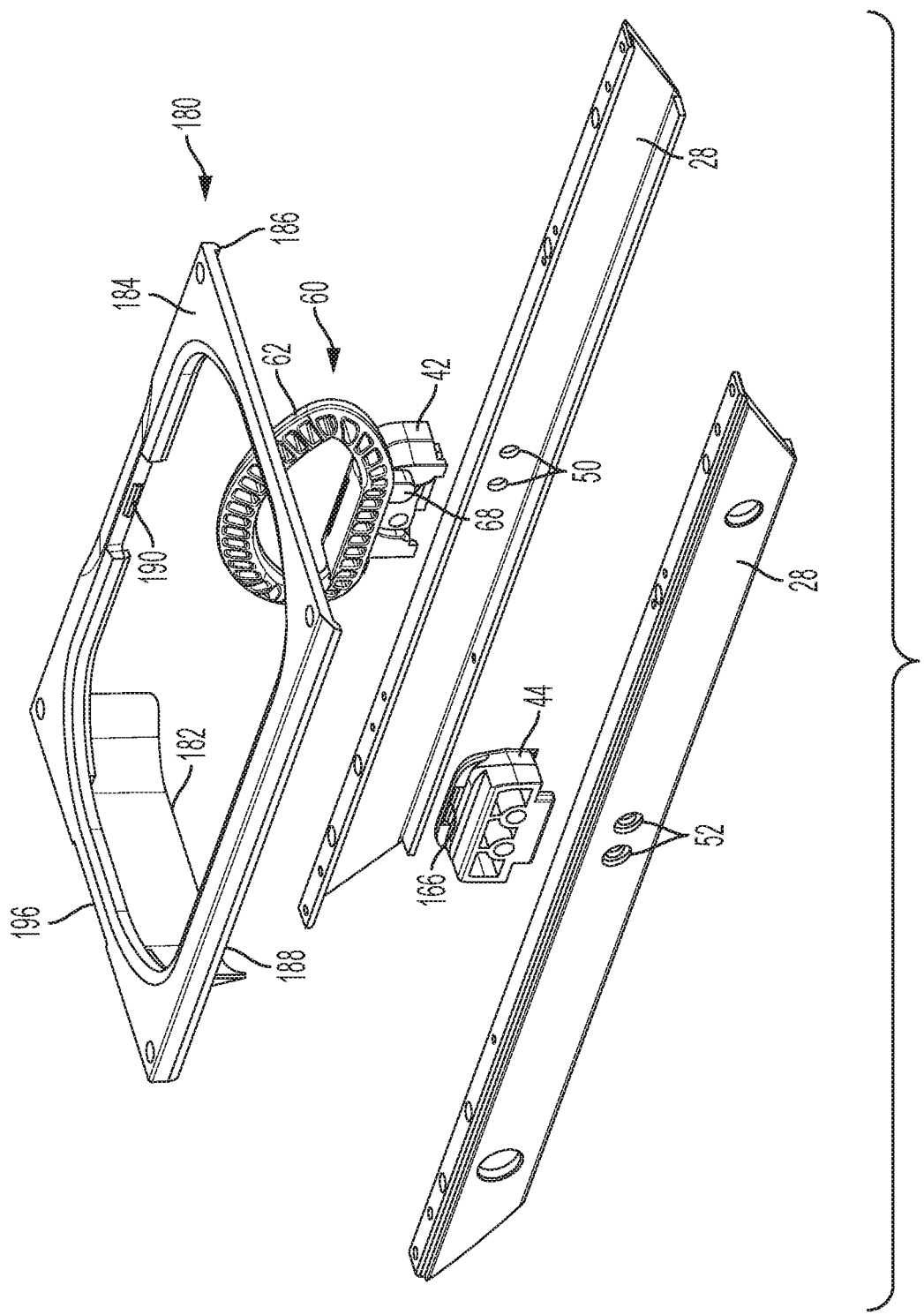
FIG. 21 is a second isometric exploded view depicting the selected components of the skateboard of FIG. 1.

As shown in FIGS. 1-21, this section describes an illustrative electric vehicle 10. Vehicle 10 is an example of the electric vehicles described in the Overview. FIGS. 1-10 show vehicle 10 from various viewpoints. FIGS. 11 and 12 are partially exploded views showing arrangements of components within deck portions of the vehicle. FIGS. 13-15 are various sectional and/or cutaway views showing further component arrangements. FIGS. 16-19 depict various views of a fender suitable for use with vehicle 10. FIGS. 20 and 21 are exploded views of selected components of the vehicle, showing aspects and relationships thereof.

Vehicle 10 is a one-wheeled, self-stabilizing skateboard similar to the electric vehicles described in U.S. Pat. No. 9,101,817 (the '817 patent), the entirety of which is hereby incorporated herein for all purposes. Accordingly, vehicle 10 includes a board 12 (AKA a tiltable portion of the vehicle, a platform, a foot deck) having a frame 14 supporting a first deck portion 16 and a second deck portion 18 defining an opening 20 therebetween. Board 12 may generally define a plane. Each deck portion 16, 18 (AKA foot pad) is configured to receive and support a left or right foot F of a rider oriented generally perpendicular to a direction of travel of the board (see FIG. 8), said direction of travel generally indicated at D. First and second deck portions 16, 18 may be formed of the same physical piece, or may be separate pieces. First and second deck portions 16, 18 may be included in board 12.

Figure 37:
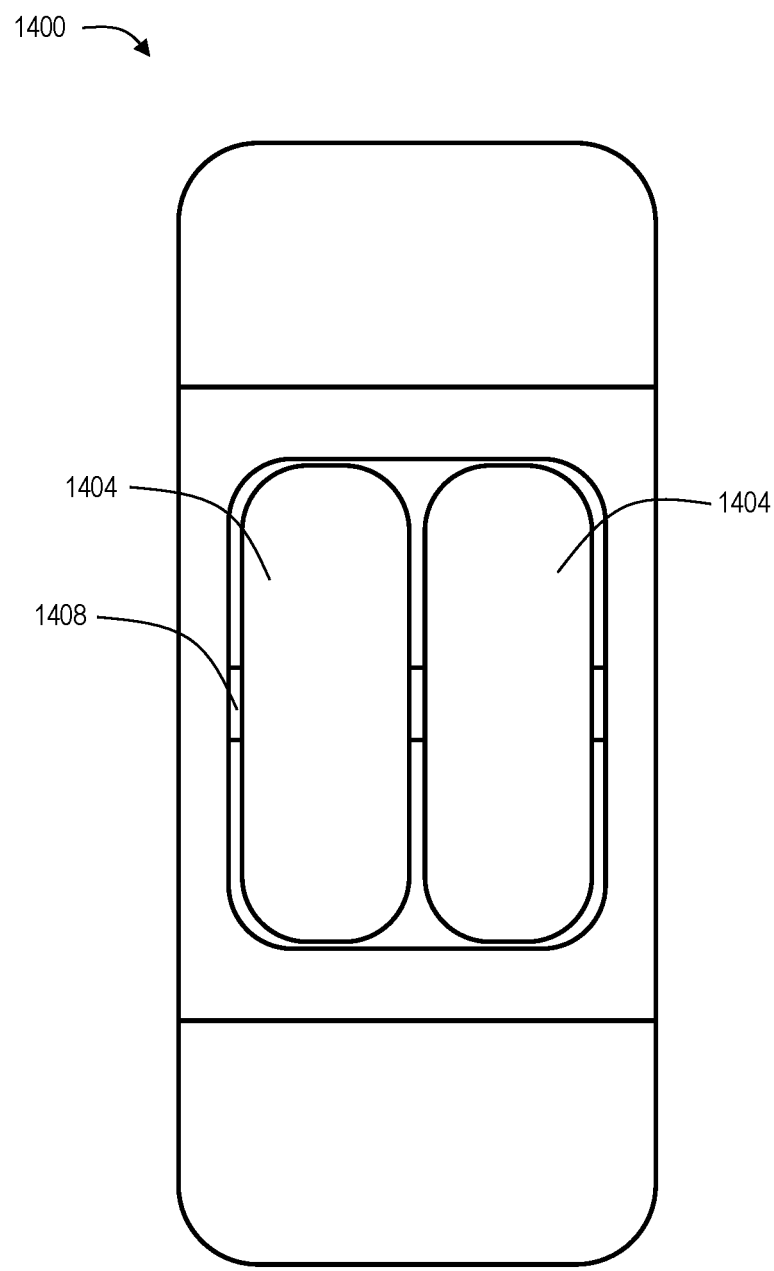
FIG. 37 is a schematic top view of an illustrative vehicle including two ground-contacting elements having a common axis of rotation, in accordance with aspects of the present disclosure.

Vehicle 10 also includes a wheel assembly 22. Wheel assembly 22 includes a rotatable ground-contacting element 24 (e.g., a tire, wheel, or continuous track) disposed between and extending above first and second deck portions 16, 18, and a motor assembly 26 configured to rotate ground-contacting element 24 to propel the vehicle. As shown in FIG. 1 and elsewhere, vehicle 10 may include exactly one ground-contacting element, disposed between the first and second deck portions. In some examples, vehicle 10 may include a plurality of (e.g., coaxial) ground-contacting elements. For example, FIG. 37 depicts an illustrative vehicle 1400 having two ground-contacting elements 1404 rotatably mounted on an axle 1408.

Returning to FIGS. 1-21, wheel assembly 22 is disposed between first and second deck portions 16, 18. Ground-contacting element 24 is coupled to motor assembly 26. Motor assembly 26 is mounted to board 12. Motor assembly 26 includes an axle 36 (AKA a shaft), which is coupled to board 12 by one or more axle mounts and one or more fasteners, such as a plurality of bolts. Motor assembly 26 may be configured to rotate ground-contacting element 24 around (or about) axle 36 to propel vehicle 10. For example, motor assembly 26 may include an electric motor, such as a hub motor, configured to rotate ground-contacting element 24 about axle 36 to propel vehicle 10 along the ground. For convenience, ground-contacting element 24 is hereinafter referred to as a tire or wheel, although other suitable embodiments may be provided.

First and second deck portions 16, 18 may be located on opposite sides of wheel assembly 22 with board 12 being dimensioned to approximate a skateboard. In other embodiments, the board may approximate a longboard skateboard, snowboard, surfboard, or may be otherwise desirably dimensioned. In some examples, deck portions 16, 18 of board 12 may be at least partially covered with non-slip material portions 38, 40 (e.g., grip tape or other textured material) to aid in rider control.

Frame 14 may include any suitable structure configured to rigidly support the deck portions and to be coupled to the axle of the wheel assembly, such that the weight of a rider may be supported on tiltable board 12 and having a fulcrum at the wheel assembly axle. Frame 14 may include one or more frame members 28, on which deck portions 16 and 18 may be mounted, and which may further support additional elements and features of the vehicle, such as a charging port 82, a power switch 80, and end bumpers 32, 34, as well as lighting assemblies, battery and electrical systems, electronics, controllers, and the like (see, e.g., FIG. 22 and corresponding description).

Deck portions 16 and 18 may include any suitable structures configured to support the feet of a rider, such as non-skid surfaces 38, 40, as well as vehicle-control features, such as various sensors and a rider detection system 78. In some examples, a rider detection system includes a strain gauge rider detection system. Illustrative deck portions, including other suitable rider detection systems, are described in the '817 patent, as well as in U.S. Pat. No. 9,452,345, the entirety of which is hereby incorporated herein for all purposes. Deck portions 16 and 18 of the present example, as well as related features, are described in further detail below.

A shaft or axle 36 of hub motor 26 is coupled to frame 14, as shown in FIG. 1. For example, the axle may be directly attached to frame 14, or may be coupled to the frame at each end through a respective connection or axle mounting block 42, 44 (also referred to as an axle mount or a simply a mounting block). Axle 36 may be bolted or otherwise affixed to mounting blocks 42, 44, e.g., at either end, which in turn may be bolted or affixed to frame 14 using suitable fasteners (e.g., by bolts 46, 48). Through-holes 50, 52 may be provided in frame 14 for receiving fasteners of the axle and mounting blocks, thereby securing the components together.

Vehicle 10 has a pitch axis A1, a roll axis A2, and a yaw axis A3 (see FIG. 1). Pitch axis A1 is the axis about which tire 24 is rotated by motor assembly 136. For example, pitch axis A1 may pass through axle 36 (e.g., pitch axis A1 may be parallel to and aligned with an elongate direction of axle 36). Roll axis A2 is perpendicular to pitch axis A1, and may substantially extend in direction D (i.e., the direction in which vehicle 10 may be propelled by the motor assembly). For example, roll axis A2 may extend in an elongate direction of board 12. Yaw axis A3 is perpendicular to pitch axis A1 and to roll axis A2. For example, yaw axis A3 may be normal to a plane defined by deck portions 16, 18, as shown in FIG. 1. Axes A1 and A2 may be analogous to the Y and X axes (e.g., corresponding to horizontal), while axis A3 is analogous to the Z axis (e.g., corresponding to vertical). Pitch axis A1 and roll axis A2 may lie in a plane of the board. In some embodiments, the pitch and roll axes may define this plane.

Tire 24 may be wide enough in a heel-toe direction (e.g., in a direction parallel to pitch axis A1) that the rider can balance in the heel-toe direction manually, i.e., by shifting his or her own weight, without automated assistance from the vehicle. Tire 24 may be tubeless, or may be used with an inner tube. In some examples, tire 24 may be a non-pneumatic tire. For example, tire 24 may be "airless", solid, and/or may comprise a foam. Tire 24 may have a profile such that the rider can lean vehicle 10 over an edge of the tire (and/or pivot the board about roll axis A2 and/or yaw axis A3) through heel and/or toe pressure to facilitate cornering of vehicle 10.

Motor assembly 26 may include any suitable driver of tire/wheel 24, such as a hub motor 54 mounted within tire (or wheel) 24. The hub motor may be internally geared or may be direct-drive. The use of a hub motor facilitates the elimination of chains and belts, and enables a form factor that considerably improves maneuverability, weight distribution, and aesthetics. Mounting tire 24 onto hub motor 54 may be accomplished by either a split-rim design that may use hub adapters, which may be bolted on to hub motor 54, or by casting a housing of the hub motor such that it provides mounting flanges for a tire bead directly on the housing of the hub motor.

With continuing reference to FIGS. 1-10, first bumper 32 is integrated into (or coupled to) a first end 56 of board 12 proximal first deck portion 16, and second bumper 34 is integrated into (or coupled to) a second end 58 of board 12 proximal second deck portion 18. Bumpers 32, 34 may be referred to as skid pads, and may be replaceable and/or selectively removable. For example, the bumpers may include replaceable polymer parts or components, and/or may each be entirely replaceable as a single piece. In some embodiments, the bumpers may be configured to allow the rider to bring vehicle 10 to a stop in an angled orientation (e.g., by setting one end of the board against the ground after the rider removes their foot from a rider detection device or switch, which is described below in further detail). In this context, the bumpers may be configured to be abrasion-resistant and/or ruggedized. A removable connection of the bumpers to the board may enable the rider (or other user) to selectively remove one or more of these components that become worn with abrasion, and/or replace the worn bumper(s) with one or more replacements.

As shown in FIGS. 1, 2, 4, 5, 6, 8, 9, 20, and 21 vehicle 10 includes a stowable handle 60. Handle 60 is disposed on a lateral side of wheel 24, adjacent hub motor 54, and is transitionable between a first configuration (see FIGS. 4, 8), in which a graspable grip portion 62 of the handle is stowed in a position proximate the hub motor, and a second configuration (see FIGS. 4, 9), in which grip portion 62 is pivoted or folded into a position extending or protruding transverse to the stowed position, such that the grip portion may be engaged by a hand of the user to carry or transport the board. With the board in an operational position on a support surface, the grip of the handle may be substantially vertical in the first configuration (preventing breakage, interference with riding, etc.) and substantially horizontal in the second configuration. The first configuration may be referred to as the "stowed" position, the "up" position, the "riding" position, the "operational" position, the "unde-ployed" position, and/or the "in" position. The second configuration may be referred to as the "carrying" position, the "down" position, the "portable" position, the "deployed" position, and/or the "out" position.

In addition to grip portion 62, handle 60 includes a hinge 64 (comprising hinge knuckles 66 configured to receive a hinge pin) and a magnetic tab 68 extending away from the hinge in a direction opposite to the grip portion. Handle 60 may be pivotably coupled to any suitable fixed feature of the vehicle, such as the frame, fender, or axle block. In this example, handle 60 is coupled to axle mounting block 42 by hinge 64, e.g., on an inboard upper side of the block. Accordingly, magnetic tab 68 is configured to contact and be biased toward (i.e., attracted to) mounting block 42 when handle 60 is in the stowed position. To facilitate this biasing, one or more magnets may be disposed in tab 68 and/or in block 42, such that sufficient magnetic attraction is provided to prevent undesired displacement of the handle during operation of the vehicle.

The user may manually place handle 60 into the second, carrying position by overcoming the magnetic biasing and pivoting the grip portion outward. Tab 68 is rigidly coupled to the grip portion (e.g., being formed as a single piece with the grip), and therefore pivots in an inboard direction away from mounting block 42. Grip portion 62 has a shaped profile when viewed from an end of the vehicle, such that when the handle is in the stowed position, a proximal portion of the grip extends away from the hub motor at an angle, then becomes substantially vertical at a midpoint. Correspondingly, the proximal portion of the grip extends substantially horizontally when in the carrying position, then curves such that a distal portion of the grip is angled upward. This shaped profile facilitates storage and carrying features. In some examples, a spring-loaded hinge (e.g., using a torsion spring) may be utilized in addition to or instead of the magnet arrangement.

In some examples, contact between tab 68 and mounting block 42 may be monitored (e.g., by a sensor), such that the motor controller can function differently based on the position of the handle. For example, the motor controller may interlock the hub motor with the handle, such that the hub motor will not engage unless the handle is in the stowed position.

In some examples, the magnetic biasing of tab 68 toward mounting block 42 may be selectively controllable, such as by using electromagnets. In such examples, the magnetic biasing may be turned on and off, and/or made stronger or weaker, based on operating conditions of the vehicle. For example, biasing may be strengthened when the hub motor is in operation, and weakened or turned off when the hub motor is stopped. This type of controllable biasing may be provided in combination with permanent magnets and/or other biasing mechanisms, such as a spring-loaded hinge, etc.

Components of handle 60 may be constructed using injection-molded plastic and/or machined or cast metal. Portions configured to be grasped manually by the user may be overmolded using a resilient material, e.g., a rubber or a soft plastic, to create a more comfortable grip.

Figure 2:
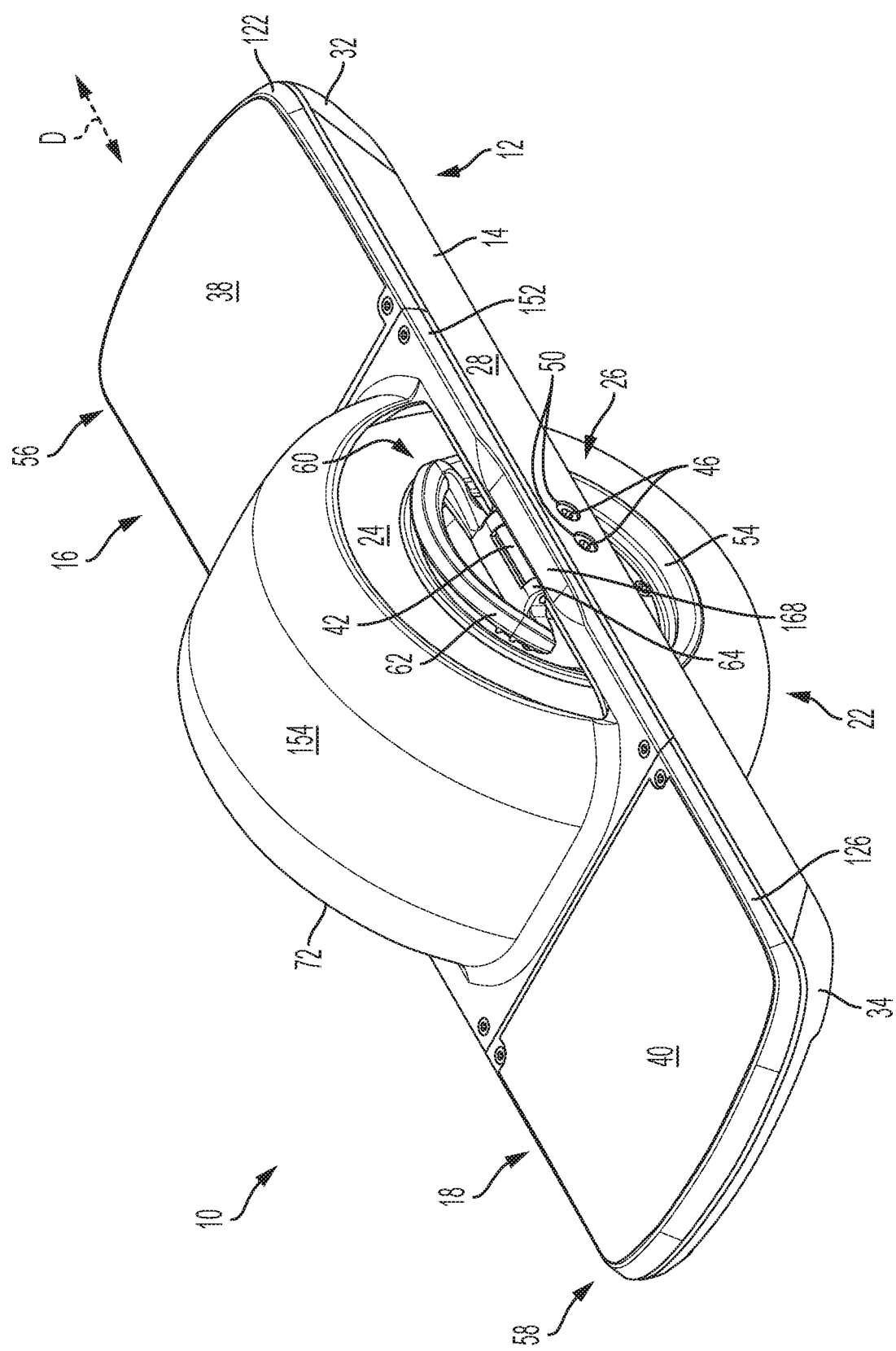
FIG. 2 is an isometric view of the skateboard of FIG. 1, with an exemplary fender installed.
Figure 3:
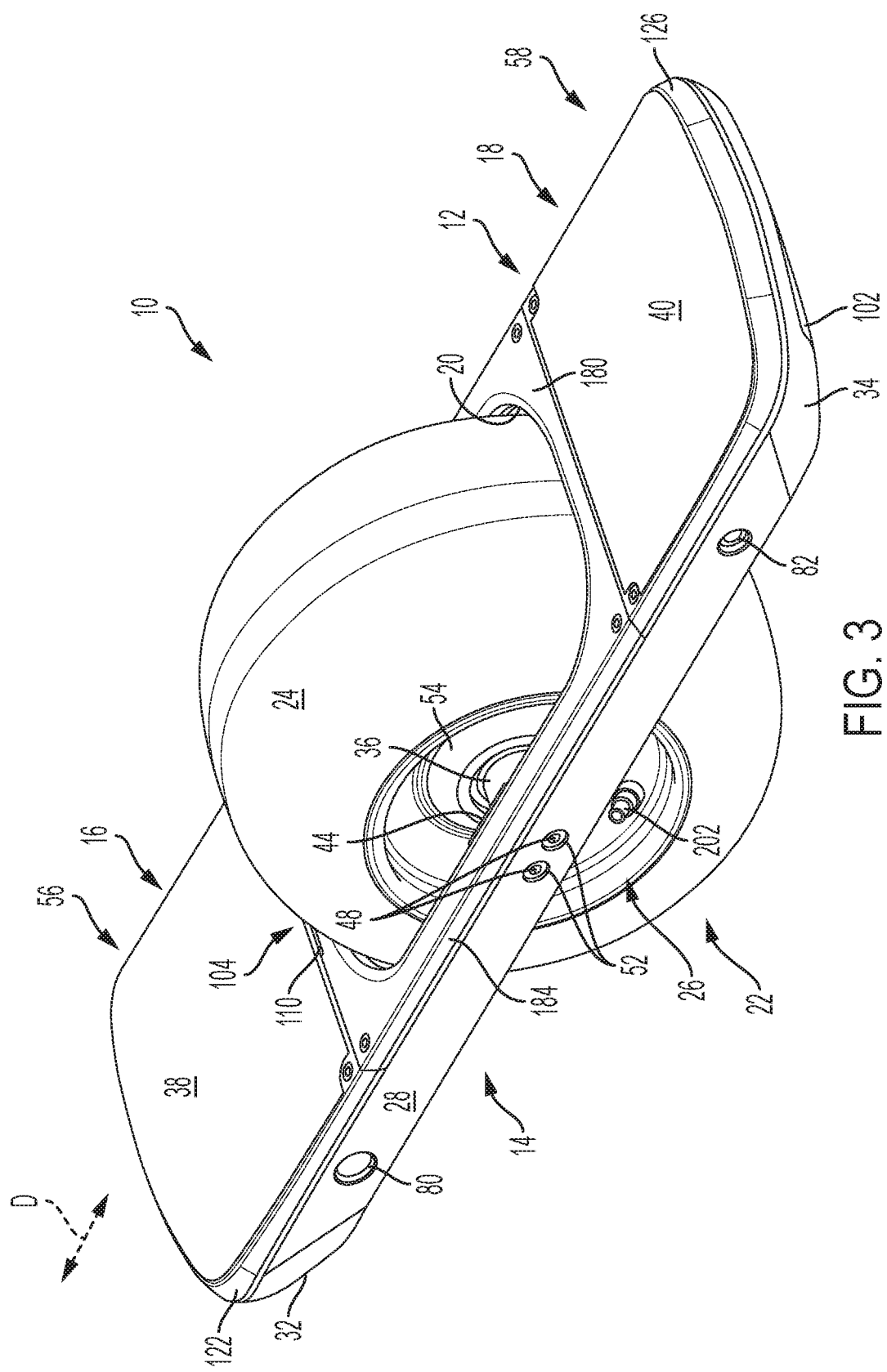
FIG. 3 is another isometric view of the skateboard of FIG. 1, taken from a different vantage point.
Figure 4:
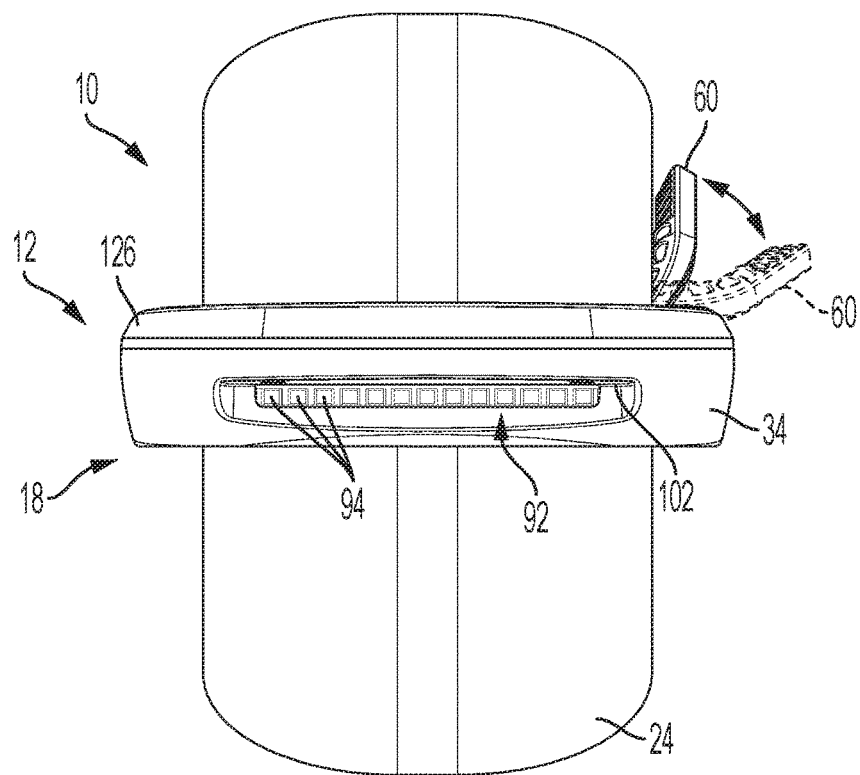
FIG. 4 is a first end elevation view of the skateboard of FIG. 1.
Figure 5:
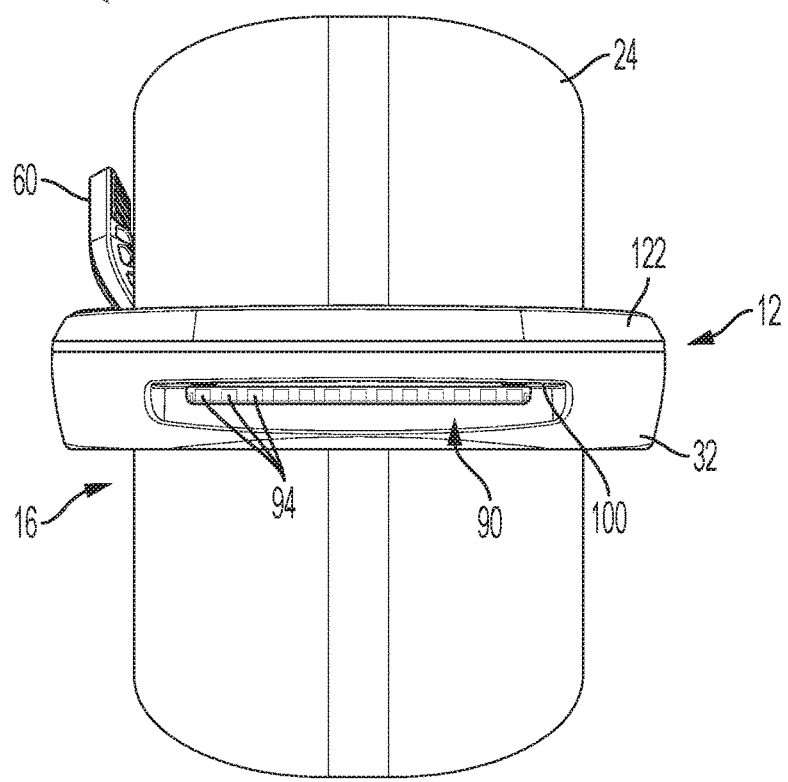
FIG. 5 is a second end elevation view of the skateboard of FIG. 1.
Figure 6:
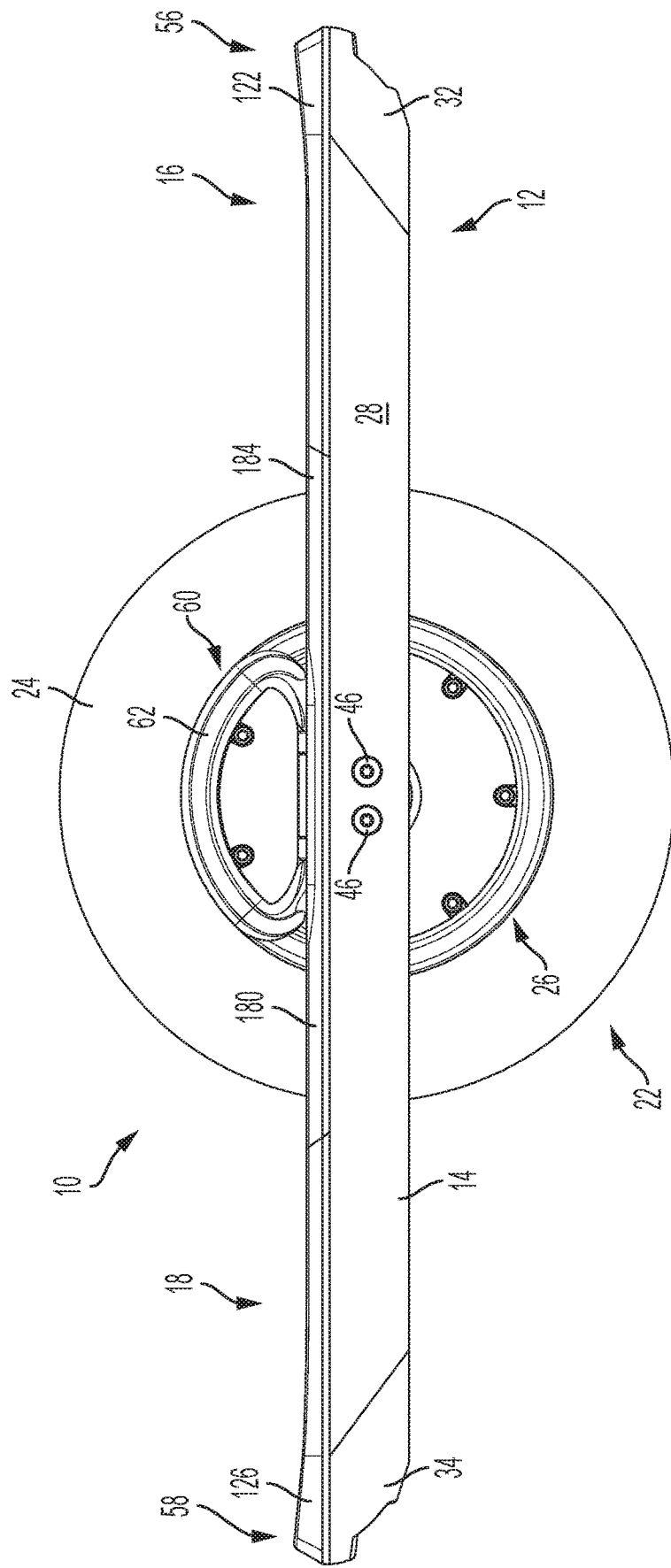
FIG. 6 is a first side elevation view of the skateboard of FIG. 1.
Figure 7:
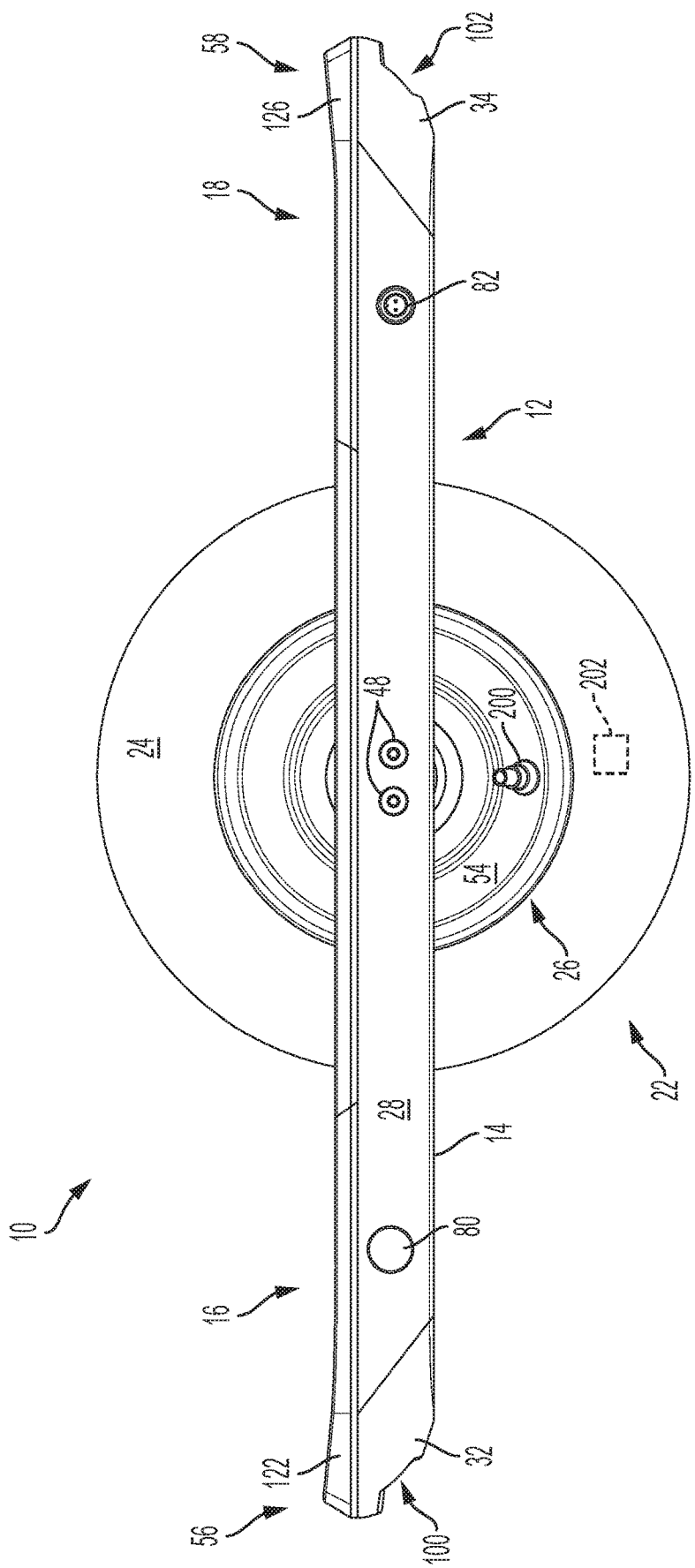
FIG. 7 is a second side elevation view of the skateboard of FIG. 1.
Figure 10:
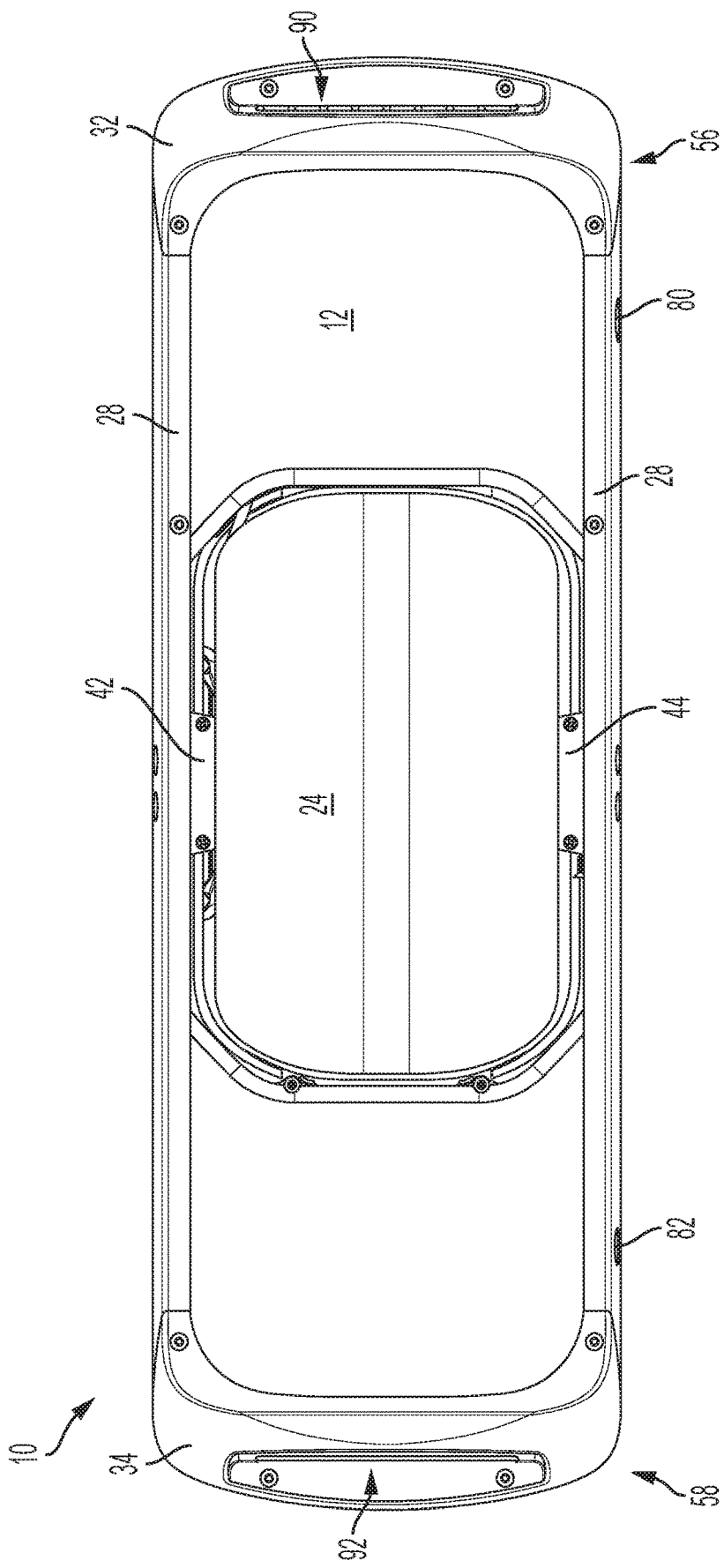
FIG. 10 is a bottom plan view of the skateboard of FIG. 1.

Vehicle 10 may include any suitable apparatus, device, mechanism, and/or structure for preventing water, dirt, or other road debris from being transferred by the ground-contacting element to the rider. For example, as shown in FIG. 2, vehicle 10 may include a fender 72 (AKA a full fender) configured to fully cover an upper periphery of tire 24. Fender 72 is coupled to frame 14, e.g., using fasteners and/or magnetic connectors, and configured to prevent debris from being transferred from tire 24 to the rider, such as when tire 24 is rotated about pitch axis A1. Fender 72 is described further below, with respect to FIGS. 16-19.

Figure 22:
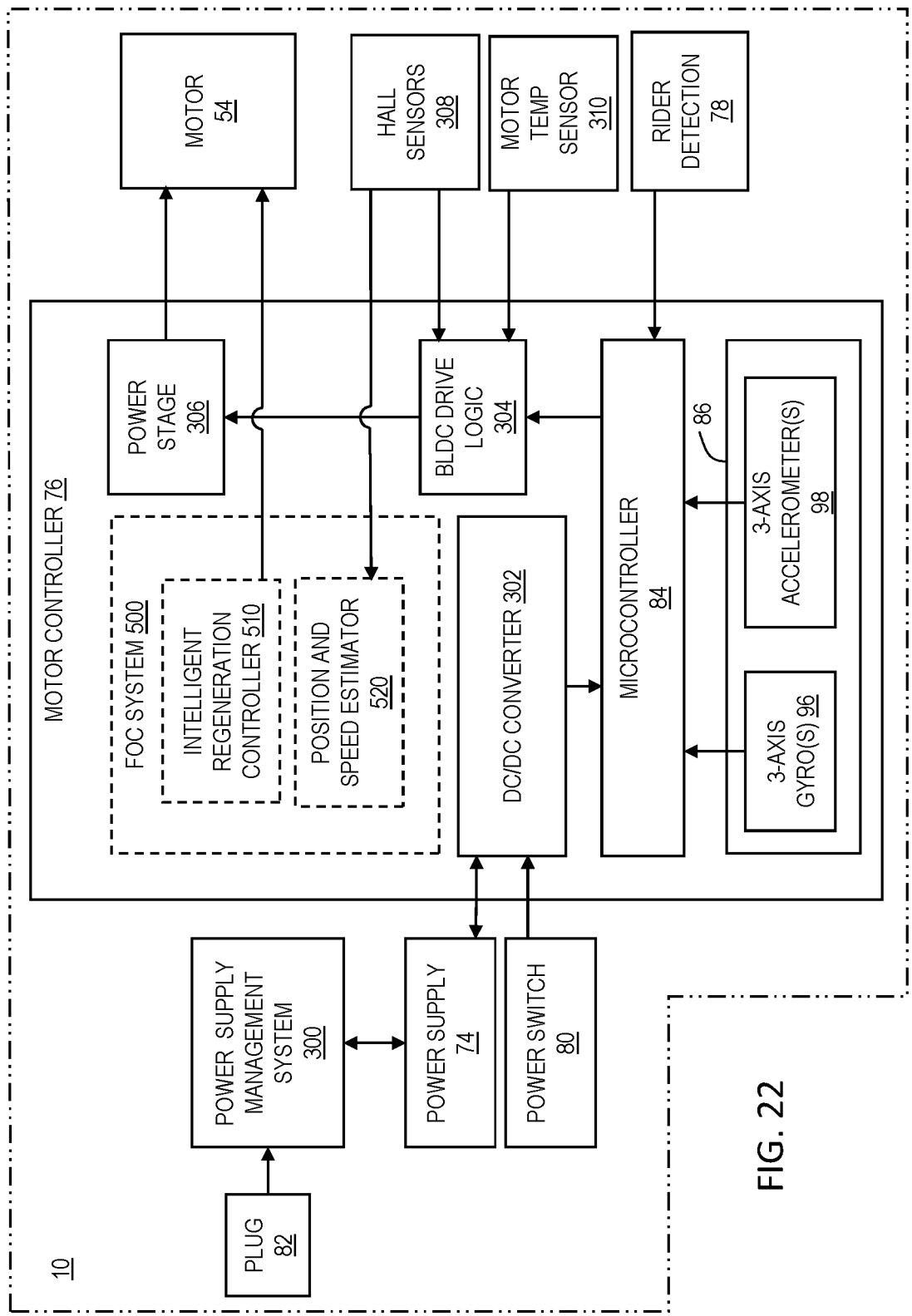
FIG. 22 is a schematic block diagram of a control system suitable for use with vehicles described herein.

As indicated in FIG. 22 and depicted variously in FIGS. 3, 7, and 11-15, the one or more electrical components of vehicle 10 may include a power supply 74, a motor controller 76, a rider detection device 78, a power switch 80, and a charge plug receptacle 82. Power supply 74 may include one or more batteries (e.g., secondary or rechargeable batteries), such as one or more lithium batteries that are relatively light in weight and have a relatively high power density. In some examples, power supply 74 may include one or more lithium iron phosphate batteries, one or more lithium polymer batteries, one or more lithium cobalt batteries, one or more lithium manganese batteries, or a combination thereof. For example, power supply 74 may include sixteen (16) A123 lithium iron phosphate batteries (e.g., size 8050). The batteries of power supply 74 may be arranged in a 16S1P configuration, or any other suitable configuration.

FIG. 13 depicts motor controller 76 as a nearly featureless printed circuit board (PCB), but the motor controller will generally include suitable electronics for controlling the vehicle motor. For example, a microcontroller 84 and/or one or more sensors (or at least one sensor) 86 may be included in or connected to motor controller 76 (see FIG. 22). At least one of sensors 86 may be configured to measure orientation information (or an orientation) of board 12. For example, sensors 86 may be configured to sense movement of board 12 about and/or along the pitch, roll, and/or yaw axes. The motor may be configured to cause rotation of wheel 24 based on the orientation of board 12. In particular, motor controller 76 may be configured to receive orientation information measured by the at least one sensor of sensors 86 and to cause motor assembly 26 to propel the electric vehicle based on the orientation information. For example, motor controller 76 may be configured to drive hub motor 54 based on received sensed movement of board 12 from sensors 86 via microcontroller 84 to propel and/or actively balance vehicle 10.

In general, at least a portion of the electrical components are integrated into board 12. For example, board 12 includes a first environmental enclosure that houses power supply 74, and a second environmental enclosure that houses motor controller 76. The environmental enclosures are configured to protect the one or more electrical components from being damaged, such as by water ingress.

Vehicle 10 further includes a plurality of light assemblies, such as one or more headlight and/or taillight assemblies (see, e.g., FIGS. 4 and 5), and a battery indicator. For example, a first headlight/taillight assembly (or first light assembly) 90 may be disposed on or at (and/or connected to) first end portion 56 of the board (e.g., at a distal end portion of first deck portion 16), and a second headlight/taillight assembly 92 may be disposed on or at (and/or connected to) second end portion 58 of the board (e.g., at a distal end portion of second deck portion 18).

Headlight/taillight assemblies 90, 92 may be configured to reversibly light vehicle 10. For example, assemblies 90, 92 may indicate the direction that vehicle 10 is moving by changing color. For example, the headlight/taillight assemblies may each include one or more high output RGB and/or red and white LEDs (or other suitable one or more illuminators) 94 configured to receive data from microcontroller 84 and/or a pitch sensor or sensors 86, such as a 3-axis gyro(s) 96 or accelerometer(s) 98) and automatically change color (e.g., from red to white, white to red, or a first color to a second color) based on the direction of movement of vehicle 10. The first color shines in the direction of motion and the second color shines backward (e.g., opposite the direction of motion). For example, one or more of the headlight/taillight assemblies (e.g., their respective illuminators) may be coupled to microcontroller 84 via an LED driver, which may be included in or connected to motor controller 76.

In some embodiments, the illuminators of assemblies 90, 92 may include RGB/RGBW LEDs. In a preferred embodiment, each LED is individually addressable, such that user adjustment of lighting color is permitted. Additional functionality, such as turn signal indication/animation and/or vehicle state information (e.g., battery state, operational vs. disabled by interlock, etc.) may also be provided.

Assemblies 90, 92 and their associated illuminators may be located in and/or protected by bumpers 30, 32. For example, bumpers 30, 32 may include respective apertures 100, 102, through which illuminators may shine. Apertures 100, 102 may be dimensioned to prevent the illuminators from contacting the ground. For example, apertures 100, 102 may each have a depth or inset profile.

Vehicle 10 may also include a power supply status indicator, specifically a battery indicator 104 comprising one or more illuminators 106 (e.g., LEDs) disposed within a housing 108 of motor controller 76. Battery indicator 104 may include any suitable illuminator(s) configured to indicate a state of power supply 74, e.g., by way of a signal provided to the battery indicator by the microcontroller and/or directly or indirectly from the power supply. Battery indicator 104 is viewable by a rider, e.g., during operation of the vehicle, through an aperture or slot 110 formed in an upper side of one of the foot pads. In this example, slot 110 is formed in second deck portion 18 as shown in FIGS. 8 and 9.

In this example, battery indicator 104 is an LED strip visible to the rider. Seven illuminators 106 are provided, using RGB-capable LED lights, although more or fewer may be utilized. The LED strip is programmable, and configured to display a battery state of charge as a bar graph and/or by a color (e.g., starts green when fully charged, goes through yellow, to red when nearing full discharge). The LED strip may also flash error codes, display status of footpad zone activation (i.e., via rider detection system 78), display alerts/alarms, blink code warnings, and/or the like. In some examples, LED behavior may be programmed to disappear while riding and only fade back in when stopped (or below a threshold speed). This mode of operation prevents the rider from looking down while riding. One or more of the above-described modes may be remotely selectable by a user. In some examples, the modes and, for example, a brightness adjustment, may be controllable from a software application running on a user's smartphone or other mobile device. In some examples, brightness may be based on either absolute brightness setting, or some other variable, e.g., a time of day adjustment (dimmer at night).

To facilitate and enhance viewing of illuminators 106 through slot 110, a portion of housing 108 includes a light pipe 112 extending from adjacent the illuminators to (and in some examples, into) the slot. See FIG. 13-15. Light pipe 112 may include any suitable structure configured to transmit light from the illuminators (e.g., mounted on a circuit board within the controller housing) to the slot 110. For example, light pipe 112 may be an optical fiber or a solid transparent material, and may be flexible or rigid. In this example, light pipe 112 is formed as a wide column of solid transparent material to cover a linear array of LED illuminators at a lower end and to interface with or fit into slot 110 at an upper end (see FIG. 15). In some examples, an upper portion of light pipe 112 fills slot 110, thereby plugging the slot and preventing or reducing the incursion of debris and the like. Light pipe 112 may be formed as a single piece with a lid 114 of housing 108, which is coupled to the base of the housing. Some or all of housing 108 may comprise a transparent material (e.g., clear polycarbonate), which may include optical windows for the headlights and battery indicator LEDs. Areas of the housing that are not used as optical windows may be aggressively textured (e.g., on both the inside and outside surfaces) to prevent visibility into the controller housing. Using a clear material with etching or texturing, rather than assembling clear windows into an opaque controller housing, helps to simplify construction and prevent potential seal failure points.

Turning to FIGS. 11 and 12, an illustrative arrangement of components within each of the deck portions will now be described. FIG. 11 is a partially exploded view of deck portion 16. As depicted, deck portion 16, in this example, includes nonskid sheet 38, which is layered on a membrane switch 120 of rider detection system 78, which in turn is disposed on a first footpad 122 (AKA the front footpad). Footpad 122 may include any suitable rigid, generally planar structure configured to support the rider on board 12. In this example, footpad 122 is thicker on one end, such that an upper surface of footpad 122 is curved upward slightly toward end 56 of the board. Footpad 122 is coupled directly to frame 14, and supported thereon. Apertures 124 are provided in footpad 122 for receiving conductors (e.g., wires) to connect membrane switch 120 with motor controller 76. Motor controller 76 is housed (at least partially) in housing 108, which is disposed under footpad 122 within the board. An undercarriage is provided by an extension of front bumper 32, or in some examples by a separate housing or expanse of rigid material.

FIG. 12 is a partially exploded view of deck portion 18. As depicted, deck portion 18, in this example, includes nonskid sheet 40, which is disposed on a second footpad 126 (AKA the rear footpad). Footpad 126 may include any suitable rigid, generally planar structure configured to support the rider on board 12. In this example, footpad 126 is thicker on one end, such that an upper surface of footpad 126 is curved upward slightly toward end 58 of the board. Footpad 126 is coupled directly to frame 14, and supported thereon. Power supply 74 is housed under footpad 126, inside an upper battery cover 128 and a lower battery housing 130. An undercarriage is provided by the battery housing and/or an extension of rear bumper 34, or in some examples by a separate housing or expanse of rigid material.

As depicted in FIG. 15, an inboard end of deck portion 16 may be open or uncovered. This opening is covered or substantially sealed, and interior components are protected, by a skirt portion or downward flange 150 of fender 72 (see FIGS. 16-19). Fender 72 further includes a peripheral flange 152 configured to seat on frame 14 and be coupled thereto, e.g., by fasteners such as screws or bolts. A dome or arch portion 154 of the fender extends from front and rear ends of the peripheral flange, and is configured to overarch tire 24 from front to rear. Arch portion 154 also includes downward-curved lateral edges, such that the arch portion partially follows the side contours of the tire as well. A lower ridge 156, 158 extends along lateral edges of the peripheral flange, and is configured to interface with an outer edge (e.g., a groove) of the underlying frame member. An inner protrusion 160, 162 of flange 152 is configured to mate with a corresponding channel 164, 166 in each of the mounting blocks 42, 44, e.g., in a snap-into-place manner. On one side, corresponding to the side where handle 60 is mounted, a beveled edge 168 is provided in an inboard side of flange 152, to facilitate placement of the handle into the carrying position. A notch 170 is formed in an end of the peripheral flange, such that notch 170 corresponds with a notch 172 of first footpad 122 to form slot 110.

Alternatively, a fender substitute 180 (AKA the "fender delete") may be installed in place of the full fender, as shown in FIG. 1 and elsewhere. With reference to FIGS. 20 and 21, fender substitute 180 includes a skirt portion 182 (analogous to skirt portion 150), a peripheral flange 184 (analogous to flange 152), lower ridges 186, 188 (analogous to ridges 156, 158), inner protrusions 190, 192 (analogous to protrusions 160, 162), beveled edge 194 (analogous to beveled edge 168), and notch 196 (analogous to notch 170), all substantially as described above with respect to fender 72.

The fender and dummy fender are configured to cover and protect the frame members, manage the gap around the tire (e.g., for safety and aesthetics), to snap to the axle mounting blocks for additional retention, and to provide additional protection from water/mud ingress into motor controller 76 through the open end of deck portion 16.

A tire pressure sensor 200 may be included in vehicle 10, and coupled electrically/electronically to a pressure valve 202 of tire 24. Tire pressure sensor 200 may include any suitable pressure sensor, e.g., integrated into tire 24, e.g., at the valve stem, configured to sense pneumatic pressure in tire 24 and to communicate that sensed pressure, e.g., wirelessly, to the controller and/or a networked device such as a user's mobile device (e.g., smart phone). A tire pressure management system may be employed either on-vehicle or as part of a software application running on the mobile device. The management system may function to log tire pressures, display or otherwise provide high- or low-pressure warnings or alerts, and/or communicate the tire pressure for further analysis and display.

B. Illustrative Control System

FIG. 22 shows a block diagram of various illustrative electrical components of vehicle 10, including onboard controls, some or all of which may be included in the vehicle. The electrical components may include a power supply management system 300, a direct current to direct current (DC/DC) converter 302, a brushless direct current (BLDC) drive logic 304, a power stage 306, one or more 3-axis accelerometers 98, one or more 3-axis gyros 96, one or more Hall sensors 308, and/or a motor temperature sensor 310. DC/DC converter 302, BLDC drive logic 304, and power stage 306 may be included in and/or coupled to motor controller 76. In some examples, motor controller 76 may comprise a variable-frequency drive and/or any other suitable drive. Gyro(s) 96 and accelerometer(s) 98 may be included in sensors 86.

Active balancing (or self-stabilization) of the electric vehicle may be achieved through the use of a feedback control loop or mechanism. The feedback control mechanism may include sensors 86, which may be electrically coupled to and/or included in motor controller 76. Preferably, the feedback control mechanism includes a Proportional-Integral-Derivative (PID) control scheme using one or more gyros (e.g., gyro(s) 96) and one or more accelerometers (e.g., accelerometer(s) 98). Gyro 96 may be configured to measure a pivoting of the foot deck about its pitch axis. Gyro 96 and accelerometer 98 may be collectively configured to estimate (or measure, or sense) a lean angle of board 12, such as an orientation of the foot deck about the pitch, roll and/or yaw axes. In some embodiments, gyro 96 and accelerometer 98 may be collectively configured to sense orientation information sufficient to estimate the lean angle of frame 14 including pivotation about the pitch, roll and/or yaw axes.

As mentioned above, orientation information of board 12 may be measured (or sensed) by gyro 96 and accelerometer 98. The respective measurements (or sense signals) from gyro 96 and accelerometer 98 may be combined using a complementary or Kalman filter to estimate a lean angle of board 12 (e.g., pivoting of board 12 about the pitch, roll, and/or yaw axes, with pivoting about the pitch axis corresponding to a pitch angle (about axle 36), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 96 and accelerometer 98 may be connected to microcontroller 84, which may be configured to correspondingly measure movement of board 12 about and/or along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 54 to reduce an angle of board 12 with respect to the ground. For example, if a rider were to angle board 12 downward, so that first deck portion 16 was 'lower' than second deck portion 18 (e.g., if the rider pivoted board 12 counterclockwise (CCW) about axle 36 in FIG. 7), then the feedback loop may drive motor 54 to cause CCW rotation of tire 24 about the pitch axis (i.e., axle 36) and a clockwise force on board 12.

Thus, motion of the electric vehicle may be achieved by the rider leaning his or her weight toward a selected (e.g., "front") foot. Similarly, deceleration may be achieved by the rider leaning toward the other (e.g., "back") foot. Regenerative braking can be used to slow the vehicle, as discussed further below. Sustained operation may be achieved in either direction by the rider maintaining their lean toward either selected foot.

As indicated in FIG. 22, microcontroller 84 may be configured to send a signal to brushless DC (BLDC) drive logic 304, which may communicate information relating to the orientation and motion of board 12. BLDC drive logic 304 may then interpret the signal and communicate with power stage 306 to drive motor 54 accordingly. Hall sensors 308 may send a signal to the BLDC drive logic to provide feedback regarding a substantially instantaneous rotational rate of the rotor of motor 54. Motor temperature sensor 310 may be configured to measure a temperature of motor 54 and send this measured temperature to logic 304. Logic 304 may limit an amount of power supplied to motor 54 based on the measured temperature of motor 54 to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of board 12).

Alternatively or additionally, some embodiments may include neural network control, fuzzy control, genetic algorithm control, linear-quadratic regulator control, state-dependent Riccati equation control, and/or other control algorithms. In some embodiments, absolute or relative encoders may be incorporated to provide feedback on motor position.

Figure 23:
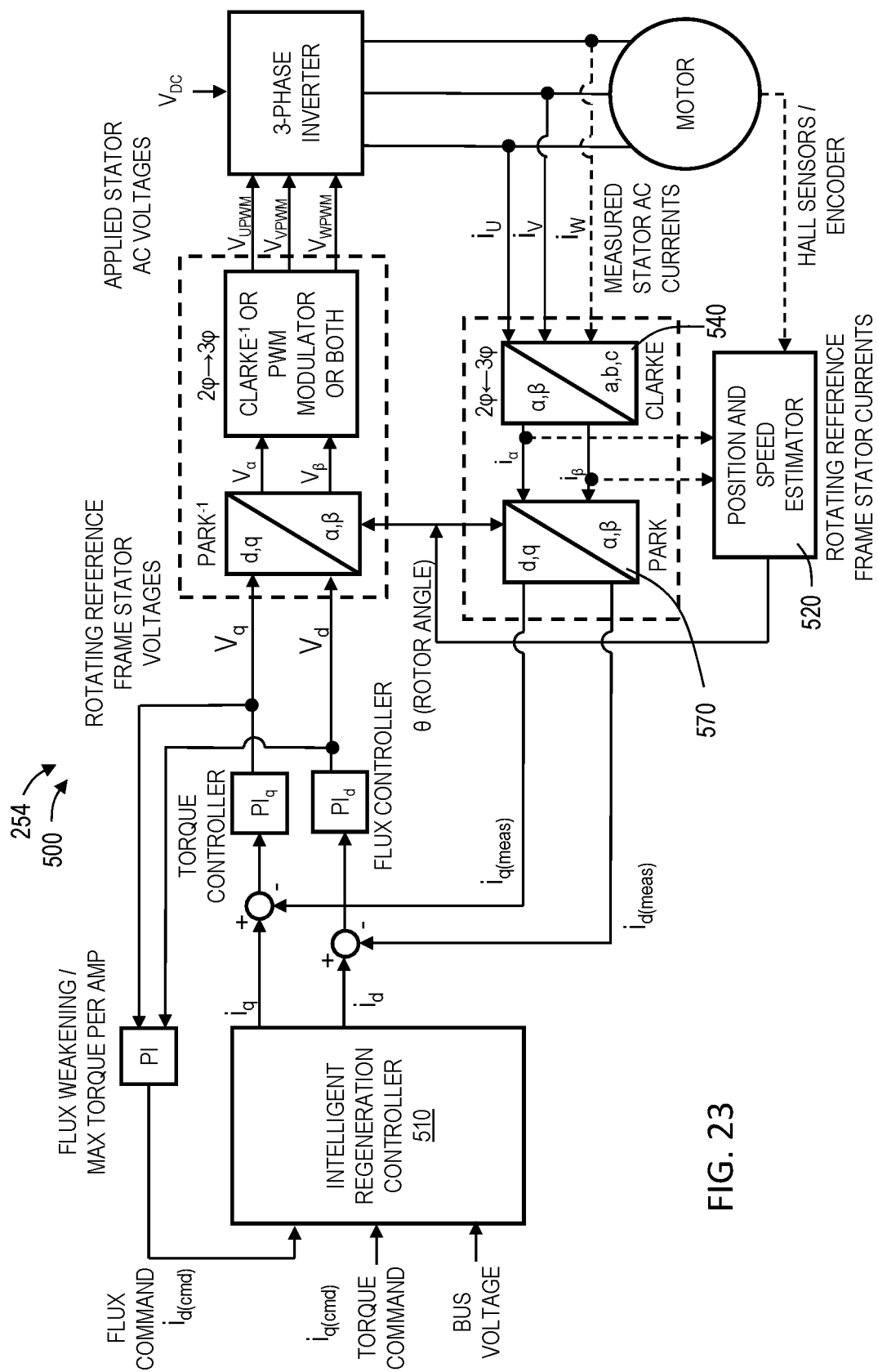
FIG. 23 is a schematic diagram of an illustrative Field Oriented Control (FOC) system in accordance with aspects of the present disclosure.

In some embodiments, a field-oriented control (FOC) or vector control system may be incorporated into the motor controller (e.g., in microcontroller 84, drive logic 304, and/or any other suitable processing logic of the motor controller). A suitable FOC system is depicted in FIG. 23. As described below with respect to FIGS. 23-31, this FOC system may be configured to divert excess regenerative current, thereby acting as a protective mechanism for the battery.

As mentioned above, during turning, the pitch angle can be modulated by the heel-toe angle (e.g., pivoting of the board about the roll axis), which may improve performance and prevent a front inside edge of board 12 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., zero degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 22, the various electrical components may be configured to manage power supply 74. For example, power supply management system 300 may be a battery management system configured to protect batteries of power supply 74 from being overcharged, over-discharged, and/or short-circuited. System 300 may monitor battery health, may monitor a state of charge in power supply 74, and/or may increase the safety of the vehicle. Power supply management system 300 may be connected between a charge plug receptacle 82 of vehicle 10 and power supply 74. The rider (or other user) may couple a charger to plug receptacle 82 and re-charge power supply 74 via system 300.

In operation, power switch 80 may be activated (e.g., by the rider). Activation of switch 80 may send a power-on signal to converter 302. In response to the power-on signal, converter 302 may convert direct current from a first voltage level provided by power supply 74 to one or more other voltage levels. The other voltage levels may be different than the first voltage level. Converter 302 may be connected to the other electrical components via one or more electrical connections to provide these electrical components with suitable voltages.

Converter 302 (or other suitable circuitry) may transmit the power-on signal to microcontroller 84. In response to the power-on signal, microcontroller may initialize sensors 86, and rider detection device 78.

The electric vehicle may include one or more safety mechanisms, such as power switch 80 and/or rider detection device 78 to ensure that the rider is on the board before engaging the feedback control loop. In some embodiments, rider detection device 78 may be configured to determine if the rider's feet are disposed on the foot deck, and to send a signal causing motor 54 to enter an active state when the rider's feet are determined to be disposed on the foot deck.

Rider detection device 78 may include any suitable mechanism, structure, or apparatus for determining whether the rider is on the electric vehicle. For example, device 78 may include one or more mechanical buttons, one or more capacitive sensors, one or more inductive sensors, one or more optical switches, one or more force-resistive sensors, and/or one or more strain gauges. Rider detection device 78 may be located on or under either or both of first and second deck portions 16, 18. In some examples, the one or more mechanical buttons or other devices may be pressed directly (e.g., if on the deck portions), or indirectly (e.g., if under the deck portions), to sense whether the rider is on board 12. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 78 may include a hand-held "dead-man" switch.

If device 78 detects that the rider is suitably positioned on the electric vehicle, then device 78 may send a rider-present signal to microcontroller 84. The rider-present signal may be the signal causing motor 54 to enter the active state. In response to the rider-present signal (and/or the board being moved to the level orientation), microcontroller 84 may activate the feedback control loop for driving motor 54. For example, in response to the rider-present signal, microcontroller 84 may send board orientation information (or measurement data) from sensors 86 to logic 304 for powering motor 54 via power stage 306.

In some embodiments, if device 78 detects that the rider is no longer suitably positioned or present on the electric vehicle, device 78 may send a rider-not-present signal to microcontroller 84. In response to the rider-not-present signal, circuitry of vehicle 10 (e.g., microcontroller 84, logic 304, and/or power stage 306) may be configured to reduce a rotational rate of the rotor relative to the stator to bring vehicle 10 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 54 even though the rider may not be present on the vehicle (e.g., temporarily), which may allow the rider to perform various tricks. For example, device 78 may be configured to delay sending the rider-not-present signal to the microcontroller for a predetermined duration of time, and/or the microcontroller may be configured to delay sending the signal to logic 304 to cut power to the motor for a predetermined duration of time.

C. Illustrative Motor Controller Using Field-Oriented Control

When a self-balancing (or other) electric vehicle utilizing a permanent magnet motor is in the process of stopping or being driven downhill, the system may be configured to inherently recover energy and oppose forward motion by causing the hub motor(s) to function as a generator, thereby converting kinetic energy into a regenerating current (typically directed to the battery) and producing a braking torque. This regenerated current can be a benefit, e.g., when used to recharge a battery. However, the current can also be damaging, e.g., if the battery is already at full capacity. Known vehicles attempt to resolve this potentially damaging overvoltage situation by forcing the rider to slow down below the regenerating threshold (which may, e.g., be 0.5 MPH), by dissipating current using resistor banks, or by suddenly shutting off. A better solution is needed to provide a better rider experience while also preventing damage to the battery.

In general, an electrical motor can function either as a motor or as a generator. When functioning as a motor, the device receives electrical power from a power source (e.g., a battery) and converts the electrical power to a torque, thereby spinning a rotor. Spinning the rotor also causes a counter electromotive force (CEMF) (also referred to as back EMF), which opposes the voltage applied by the power source (e.g., battery). In general, increasing the applied voltage speeds up the rotor. As rotor speed increases, CEMF also increases, thereby creating a greater opposing effect. Conversely, when functioning as a generator, the device receives mechanical power from a mechanical (e.g., rotating) power source, and converts the kinetic energy into electrical power. In this case, spinning the rotor also causes a counter torque or counter force, which acts to oppose the source of mechanical power. In general, this counter torque makes it increasingly more difficult to increase the rotor speed.

During normal motoring operation, electrical motors exhibit both motor and generator characteristics. The production of CEMF is in effect a generating activity. However, the CEMF is typically lower than the power source voltage, and, as long as this is the case, the motor continues to act as a load (i.e., a motor). In some instances, the CEMF may exceed the power source voltage, causing the generator function to dominate. In these situations, the device produces electrical energy that can be used or recaptured. In a regenerative braking system, the energy is recaptured by feeding it into the power source (e.g., recharging the battery).

Situations that result in this sort of regenerative activity or recapture of energy include when an electric vehicle is traveling down a hill or otherwise forcing the motor to turn faster than the commanded motor torque. When the motor turns fast enough that the CEMF exceeds the battery voltage, current will flow out of the motor and into the battery. At the same time, because the motor is now acting as a generator, a counter torque is produced. This counter torque functions as a brake on the vehicle.

Although regenerative braking of the type just described is a useful feature, it may in some situations be harmful or undesirable. For example, the vehicle's battery may already be nearly or fully charged. An over-voltage condition can damage the system, so when the battery is already nearly or fully charged, standard regenerative braking is undesirable.

Control systems described below employ a technique to reduce and/or dispose of this excess energy to prevent over-voltage damage when the vehicle is regenerating power. Specifically, energy is redirected using a version of Field Oriented Control (FOC) (also referred to as Vector Control). When the vehicle is operating, a flux current (AKA direct current) is defined having a vector aligned with the rotating rotor flux angle, and a quadrature current is defined at 90 degrees from the rotating rotor flux angle. Systems of the present disclosure redirect energy by manipulating the flux current independently from the quadrature current.

During normal operations, quadrature current is controlled in accordance with desired motor torque, while flux current is typically set to zero, e.g., so as not to counteract the motor's permanent magnets. However, in a possible over-voltage situation, systems of the present disclosure are configured to automatically weaken the motor flux by adjusting the flux current. This has two effects. First, the current used to weaken the flux is itself a load on the system, therefore opposing battery regeneration. Second, by weakening the flux, the CEMF is reduced, such that the CEMF does not exceed the battery voltage as much. Accordingly, the motor generates less of the current that would otherwise be fed into the battery.

FIGS. 23-31 relate to a field-oriented control (FOC) system and algorithm configured to manage stator voltages to run a BLDC motor of a vehicle, such as vehicle 10 described in Section A. The FOC system described below may be part of or coupled to a motor controller, such as motor controller 76 described in Section B.

In general, FOC is used to ensure maximum torque is applied for a given amount of current, by maximizing the net current vector in a direction 90-degrees with respect to the rotor flux. This is accomplished by controlling two orthogonal component vectors: a direct current ($i_d$) pointed along the rotor flux axis and a quadrature current ($i_q$) pointed 90 degrees from the direct current vector. As mentioned above, the direct current may be referred to as the flux current.

The orientations of the vectors mean that maximizing the quadrature current and minimizing the direct current would cause the most efficient overall net current vector (i.e., at 90 degrees from the rotor flux). As described above, motor controllers of the present disclosure are further configured to operate the motor inefficiently when the battery is in danger of an over-voltage condition. To do this, the controller selectively causes the direct (flux) current to be raised when counter-electromotive force (CEMF) is greater than battery voltage, thereby both weakening the rotor flux (and CEMF) and dumping excess current along a non-torque-inducing vector.

Figures 28, 29:
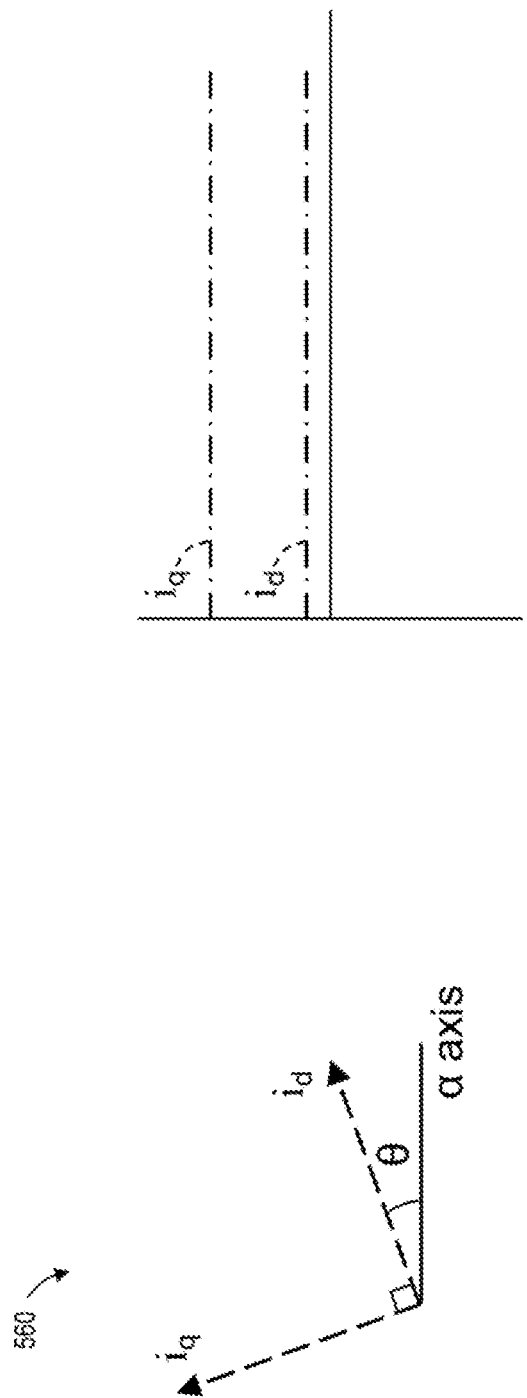
FIG. 28 is a schematic diagram depicting an illustrative rotating two-axis reference system used by the FOC system of FIG. 23.
FIG. 29 is a schematic diagram depicting the variation with time of two illustrative currents associated with the reference system of FIG. 28.
Figure 30:
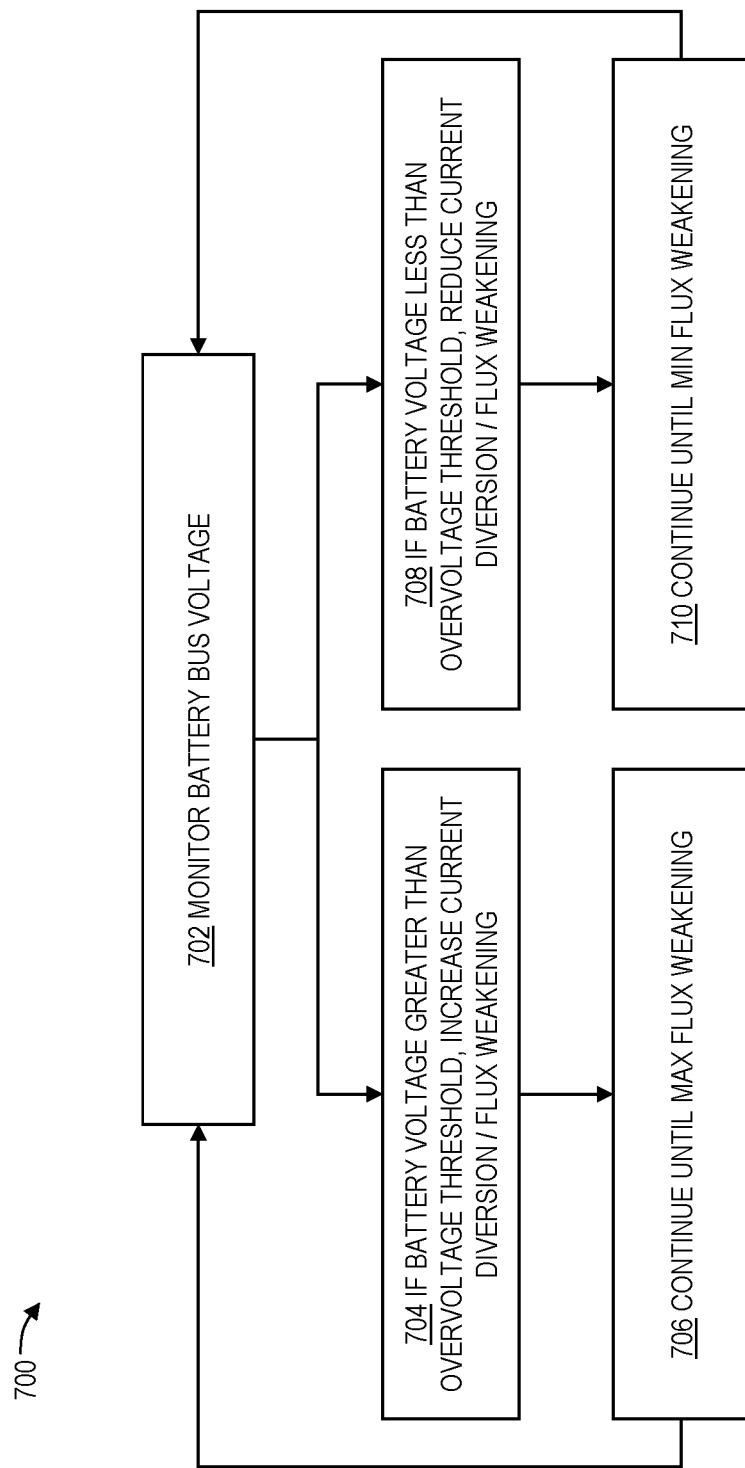
FIG. 30 is a flowchart depicting steps of an illustrative method for limiting over-voltage conditions in an electric vehicle using an FOC system according to the present teachings.
Figure 31:
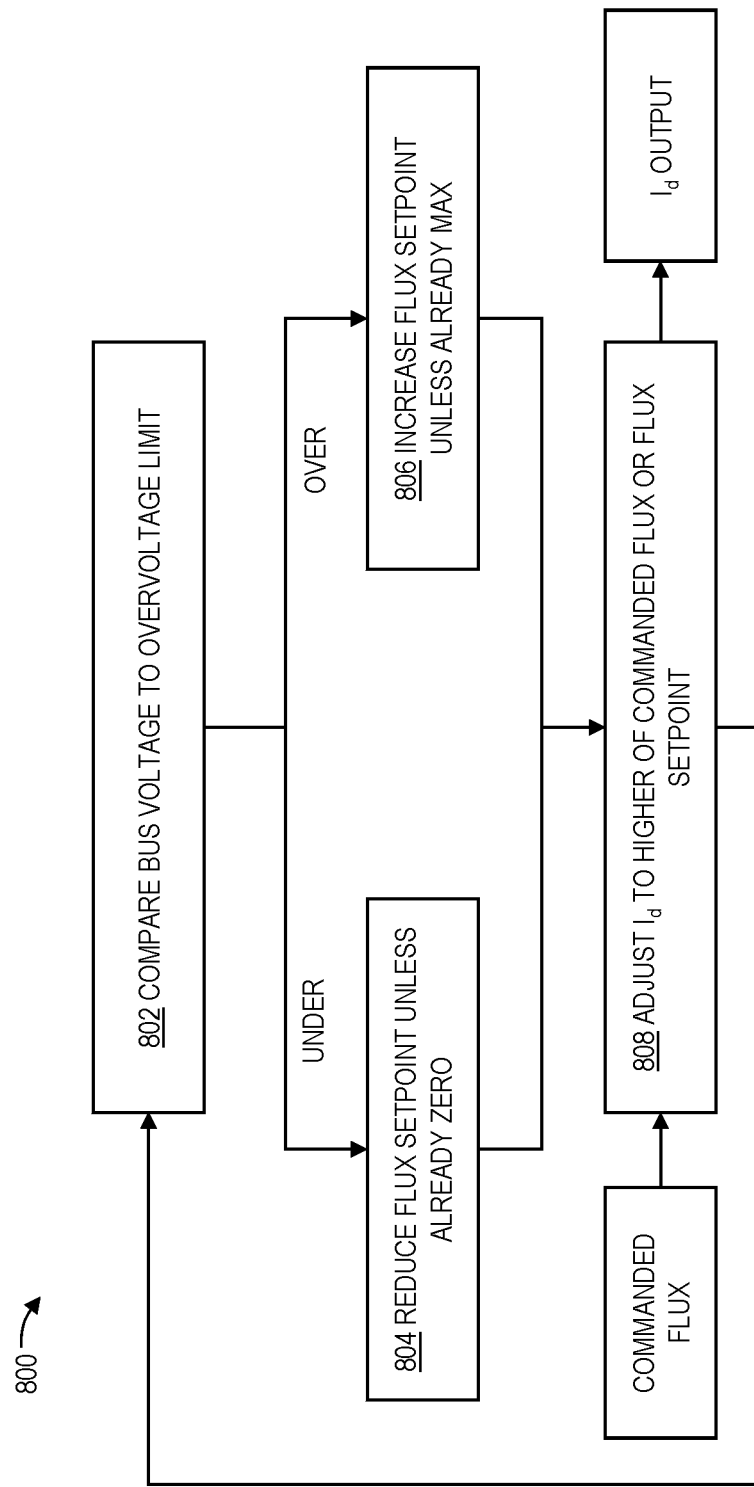
FIG. 31 is a flowchart depicting steps of another illustrative method for limiting over-voltage conditions in an electric vehicle using the FOC system according to the present teachings.

FIG. 23 is a block diagram of an illustrative FOC system 500 (also referred to as a FOC scheme or FOC platform) suitable for use with aspects of the present disclosure. FIGS. 24-29 depict the various vector current frameworks discussed below. FIGS. 30 and 31 depict steps of illustrative methods or algorithms (700, 800) used by FOC system 500.

Figure 25:
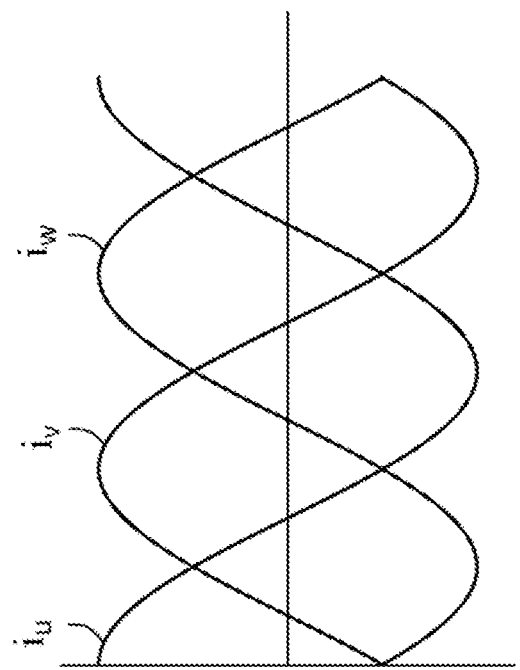
FIG. 25 is a schematic diagram depicting the variation over time of three illustrative currents associated with the reference system of FIG. 24.
Figure 24:
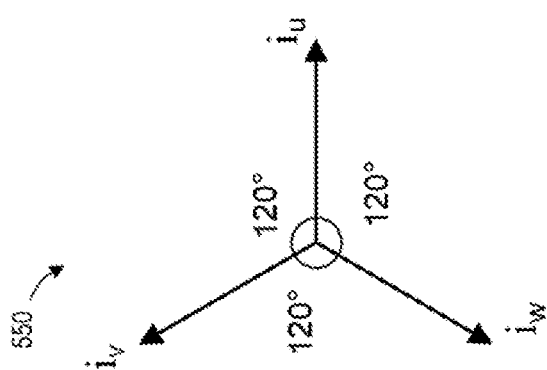
FIG. 24 is a schematic diagram depicting an illustrative three-axis reference system used by the FOC system of FIG. 23.

With reference to FIGS. 23-25, each of the three phase currents of the motor may be controlled by controlling applied stator voltages, namely $V_U$, $V_V$, and $V_W$. To this end, stator currents ($i_U$, $i_V$, and $i_W$) are measured, usually by measuring two of the currents and calculating the third. These three currents comprise vectors that can be added together to determine the resulting net current vector. Controlling the three currents therefore controls the net current vector, and a relationship between the net current vector and the rotor flux vector determines how much torque is experienced by the rotor. Specifically, maximum motor torque is achieved when the net stator current vector is ninety degrees from the rotor flux.

Figure 27:
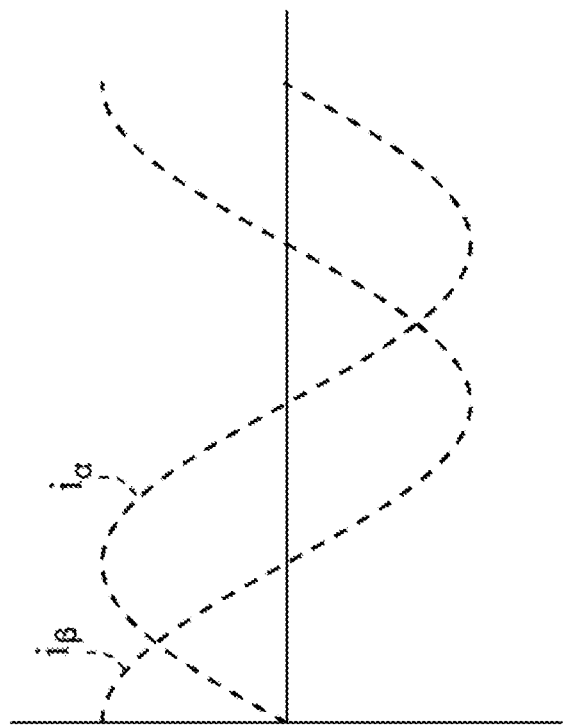
FIG. 27 is a schematic diagram depicting the variation with time of two illustrative currents associated with the reference system of FIG. 26.
Figure 26:
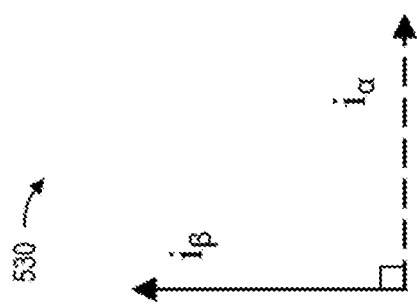
FIG. 26 is a schematic diagram depicting an illustrative two-axis reference system used by the FOC system of FIG. 23.

Controllers of this type are generally configured to maintain the net current vector at 90 degrees from the rotor flux, and to control the amount of motor torque by regulating the amplitude of the net current vector. Accordingly, the controller (e.g., a position and speed estimator module 520) measures the rotor position (e.g., using Hall sensors, an encoder, a resolver, a sensorless approach, etc.), which determines the rotor flux position, and then the controller adjusts the net current vector to be pointed 90 degrees from the rotor flux position. Rather than directly determining which values of the three stator voltages to apply, which is complex and requires additional components, system 500 first simplifies the net current vector by mathematically converting it to a two-axis framework 530 (see FIG. 26) (axes α and β) using the Clarke Transformation 540 (known in the art and also referred to as the Forward Clarke transformation). This transformation results in expression of the net current vector as its two components in the α, β reference frame: $i_\alpha$ and $i_\beta$ (see FIG. 27). These component vectors could theoretically be used to determine the desired $V_\alpha$ and $V_\beta$, which may be converted back to a three-axis system (e.g., three-axis system 550, depicted in FIG. 24) to drive the motor. However, further simplification is possible and desired, because the α and β axes form a stationary frame of reference while the net current vector is rotating through space. That means $i_\alpha$ and $i_\beta$ vary over time (e.g., sinusoidally), as shown in FIG. 27.

Accordingly, $i_\alpha$ and $i_\beta$ are transformed to a two-dimensional rotating frame of reference 560 (see FIG. 28) that is aligned and synchronized with the rotating rotor. In this reference frame, a first (direct) axis, d, is oriented along (i.e., directly aligned with) the rotor flux vector, and a second (quadrature) axis, q, is oriented at 90 degrees from the first axis. Note that the q axis is the direction in which the maximum torque is generated. A benefit of the rotating reference frame is that the axes are stationary relative to the rotor, and the component vectors will now be generally constant or slow-changing (i.e., DC currents), as shown in FIG. 29. To accomplish this simplification, $i_\alpha$ and $i_\beta$ are converted into $i_d$ and $i_q$, using the Park Transformation 570 (known in the art, and also referred to as the Forward Park Transformation).

At this point, $i_d$ and $i_q$ can be handled independently to manipulate the net current vector. It should be clear that any non-zero magnitude of $i_d$ will alter the net current vector from the quadrature (i.e., maximum-torque) direction. Accordingly, during normal operation, $i_d$ is usually commanded to be zero while $i_q$ is controlled in accordance with desired torque. With continuing reference to FIG. 23, the measured $i_d$ and $i_q$ are compared to the commanded $i_d$ and $i_q$, and respective proportional-integral (PI) controllers $PI_d$ and $PI_q$ are used to determine the corresponding $V_d$ and $V_q$. These voltage values are then passed through modules (labeled PARK$^{-1}$ and 2φ→3φ) that perform an Inverse Park Transformation and an Inverse Clarke Transformation to convert them back to the α, β stationary reference frame and finally to the three-phase values needed for applying stator voltages $V_U$, $V_V$, and $V_W$.

The question remains what the commanded $i_d$ and $i_q$ should be. As depicted in FIG. 23, system 500 includes an intelligent regeneration controller module 510 that takes the commanded flux (direct) current $i_d$, the commanded torque (quadrature) current $i_q$, and the battery bus voltage, and determines the proper desired flux current to protect the battery from an over-voltage condition.

Commanded torque will depend on the desired speed and direction of the motor, as commanded by the user/rider. For example, in vehicle 10 torque commands will be based on the tilt angle or orientation of the board, which is generally caused by user action. The flux command, on the other hand, depends on how much the system needs to weaken the overall flux, reduce the torque, and/or redirect excess current.

Turning now to FIGS. 30 and 31, methods are depicted suitable for execution by the motor controller. For example, intelligent regeneration controller 510 of system 500 may utilize one or both of these methods. Aspects of system 500 and/or vehicle 10 may be utilized in the method steps described below. Where appropriate, reference may be made to components and systems that may be used in carrying out each step. These references are for illustration, and are not intended to limit the possible ways of carrying out any particular step of the method.

FIG. 30 is a flowchart illustrating steps performed in a method 700, and may not recite the complete process or all steps of the method. Although various steps of method 700 are described below and depicted in FIG. 30, the steps need not necessarily all be performed, and in some cases may be performed simultaneously or in a different order than the order shown.

In method 700, the system (e.g., system 500) monitors a battery bus voltage of the battery that is coupled to the motor in question (block 702). Although a single battery is referenced here, any number or combination of batteries or battery cells may be present. If battery voltage becomes greater than a selected overvoltage threshold (block 704), which may be a percentage of a fully-charged voltage rating (e.g., 100%, 110%), it may be assumed that power is being generated by the motor, e.g., in a regenerative braking or other situation where the CEMF is greater than the battery voltage. In response, the system may automatically increase the flux current (direct current $i_d$ described above). This increase in flux current acts both to divert excess current along a non-torque-inducing vector (i.e., "wasting" the excess current) and to weaken the motor flux. Weakening the motor flux results in lower CEMF and less excess current being generated in the first place. While the over-voltage condition is in effect, the flux current increase may be automatically continued until a selected maximum flux weakening value is reached (block 706).

Conversely, if battery bus voltage is determined to be less than the over-voltage limit (or threshold) (block 708), then the flux current is automatically decreased or reduced. This is done to prevent inefficient operation in normal operating conditions. In other words, in this situation reducing the direct current reduces inefficiency of the motor. As long as the over-voltage condition is absent, the flux current reduction may be automatically continued until a selected minimum flux weakening value (e.g., zero amps) is reached (block 710).

FIG. 31 is a flowchart illustrating steps performed in a method 800, and may not recite the complete process or all steps of the method. Although various steps of method 800 are described below and depicted in FIG. 31, the steps need not necessarily all be performed, and in some cases may be performed simultaneously or in a different order than the order shown.

Step 802 of algorithm 800 includes comparing the bus voltage of the power supply (e.g., the battery) to an overvoltage limit or threshold. If the bus voltage is below the limit, step 804 includes reducing a flux current setpoint, unless the setpoint is already at zero. If the bus voltage is at or above the limit, step 806 includes increasing the flux current setpoint, unless the setpoint is already at a selected maximum allowable value.

Step 808 includes comparing the flux current setpoint to the commanded flux current. Whichever value is higher is then passed on to the controller as the desired flux current. In other words, if commanded flux exceeds the flux setpoint, desired flux will be set to the commanded flux. If commanded flux is less than the flux setpoint, desired flux will be set to the higher setpoint. This results in a raising of the commanded flux in situations where an overvoltage situation is in progress. Increases and decreases of the flux setpoint may be iterative in nature. In some examples, the increases and decreases happen in substantially equal jumps. In some examples, quantum increases are larger than quantum decreases, such that the redirection of current to the flux weakening vector will respond faster than the reverse operation.

After completing step 808, the algorithm loops back to step 802 to continue the control method. In some examples, this looping is substantially continuous. In some examples, each iteration of the loop is triggered by an event, e.g., in the case of an interrupt handler kicked off by an interrupt request (IRQ).

D. Illustrative Reverse-to-Dismount Methods

This section describes steps of several illustrative methods for stopping the vehicle so the rider can easily dismount. In general, the system detects when a rider has caused the board to roll backward and adjusts one or more control parameters (e.g., proportionally) to affect the self-balancing function. This effect may continue (e.g., in an increasing fashion) until a threshold is met and balancing is disengaged or disabled entirely, thereby facilitating a straightforward and intuitive dismounting process for the rider. This may result in the rider being able to dismount simply by leaning backward and causing the board to come to a stop, which is advantageous particularly for people who are learning to ride.

As further context for the following methods, additional aspects of the PID control scheme (AKA PID loop) described above will now be explained. First, the PID control system may achieve self-balancing at least in part by attempting to maintain the board at a given reference angle, also referred to as a balance angle. In a preferred example, this is a zero degree pitch angle (i.e., the board is level). In some examples, the reference angle is adjustable, e.g., directly adjustable and/or using an adjustable offset parameter, such that the control system may attempt to maintain an angle different than zero degrees. The offset balance angle can be changed manually (e.g., based on user preference) and/or automatically (e.g., see below).

Second, the PID controls may include a tuning parameter known as proportional gain. This proportional gain parameter causes the loop to produce an output that is proportional to the then-current error value (e.g., the difference between actual board angle and the reference or balance angle). Accordingly, the response of the system can be adjusted by changing the proportional gain constant. For a given change in the error, a higher proportional gain constant results in a larger change in the output and a smaller proportional gain constant results in smaller change in the output. In some examples, the proportional gain parameter contributes to a majority of the change in output, as compared with other PID loop parameters.

Accordingly, a control system may include a hub motor and a motor controller, as described above. The motor controller is configured to receive orientation information indicating an orientation of a tiltable portion of the vehicle and to cause the hub motor to propel the vehicle based on the orientation information. In this section, various schemes are described wherein the motor controller includes processing logic configured to (a) receive direction information indicating a direction in which the hub motor is being commanded to propel the vehicle; (b) in response to the direction information indicating a first direction (i.e., backward), hinder a responsiveness of the motor controller to the orientation information by automatically adjusting a first parameter of the motor controller; and (c) in response to the first parameter reaching a first threshold, disengaging or disabling the hub motor.

Various embodiments of this general control scheme will now be described, as steps of illustrative methods 900, 1000, 1100, 1200, and 1300 outlined below (see FIGS. 32-36). Aspects of the vehicles and controls described above may be utilized in the method steps of these methods. Where appropriate, reference may be made to components and systems that may be used in carrying out each step. These references are for illustration, and are not intended to limit the possible ways of carrying out any particular step of the method.

Figure 32:
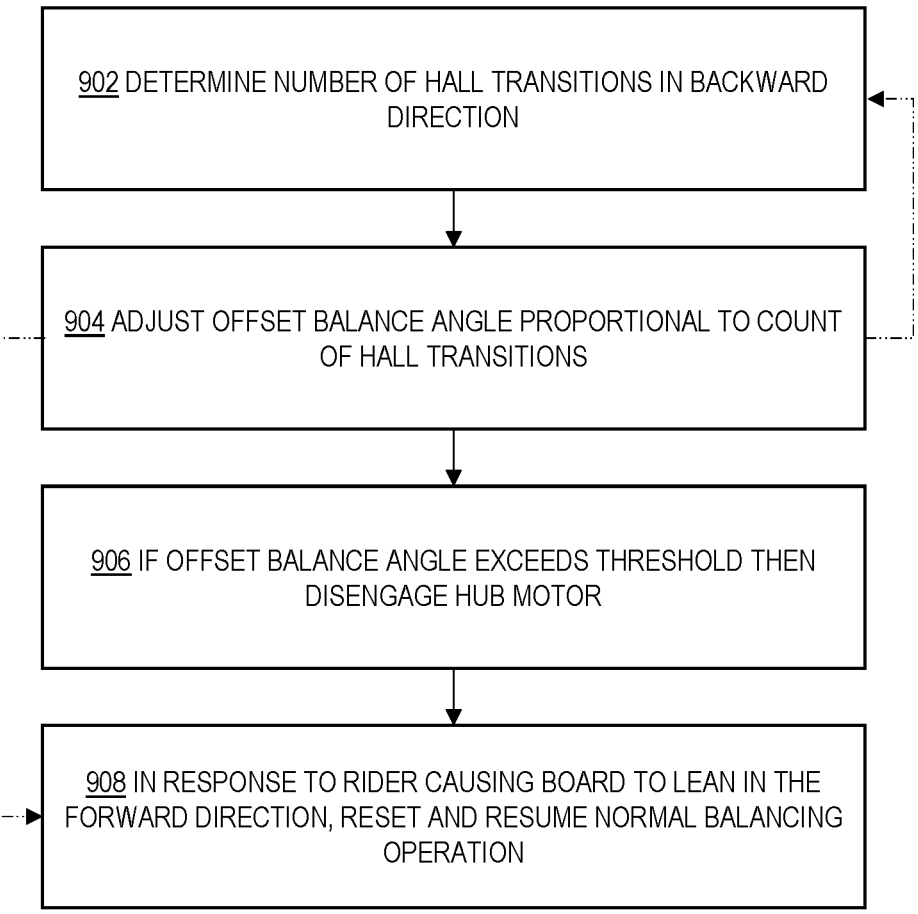
FIG. 32 is a flowchart depicting steps of a first illustrative method for controlling a one-wheeled vehicle during a rider dismount phase of operation.

FIG. 32 is a flowchart illustrating steps performed in method 900, and may not recite the complete process or all steps of the method. Although various steps of method 900 are described below and depicted in FIG. 32, the steps need not necessarily all be performed, and in some cases may be performed simultaneously or in a different order than the order shown.

At step 902, the control system of the vehicle determines how far the wheel has turned in a reverse or backward direction. For example, the system may count the number of transitions experienced by the Hall sensor(s) (e.g., Hall sensors 308), also referred to as Hall transitions, as the wheel turns in the backward direction. Any suitable method configured to determine motor and/or wheel rotation may be utilized in this step. For example, wheel and/or motor rotation may be determined by an estimator or encoder.

The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control). By determining the number of Hall transitions in the backward direction, the system has an indication of how far the motor/wheel has moved (e.g., in degrees).

Step 904 of method 900 includes adjusting (i.e., reducing) a balance angle offset parameter (a.k.a. offset balance angle) proportional (or otherwise corresponding) to the number of Hall transitions determined in step 902 (or other indicator of amount of backward rotation). This offset is in the backward direction. In other words, after the adjustment, the system may attempt to maintain balance at an angle where the "tail" end of the board is lower than the front end.

Step 906 of method 900 includes comparing the balance angle offset parameter against a threshold (e.g., an offset threshold). If the offset parameter exceeds the threshold, then the motor is disabled, e.g., by directing it to disengage or turn off. In some examples, the rotor may be locked, e.g., by applying a non-commutating current. Note that the PID loop may result in multiple passes, each of which includes repeating steps 902 and 904 and comparing the resulting offset to the threshold. When the motor is disabled, the rider is free to step off the board without concern for unexpected motion.

Step 908 of method 900 includes, in response to the rider causing the board to lean in the forward direction, resetting the offset balance angle and resuming normal self-balancing operations. In some examples, the forward lean angle of step 908 will reset the offset balance angle at any point, including before obtaining the threshold and subsequent motor shutdown. In some examples, causing the board to lean in the forward direction may include bringing the board to level (i.e., zero degrees pitch).

Figure 33:
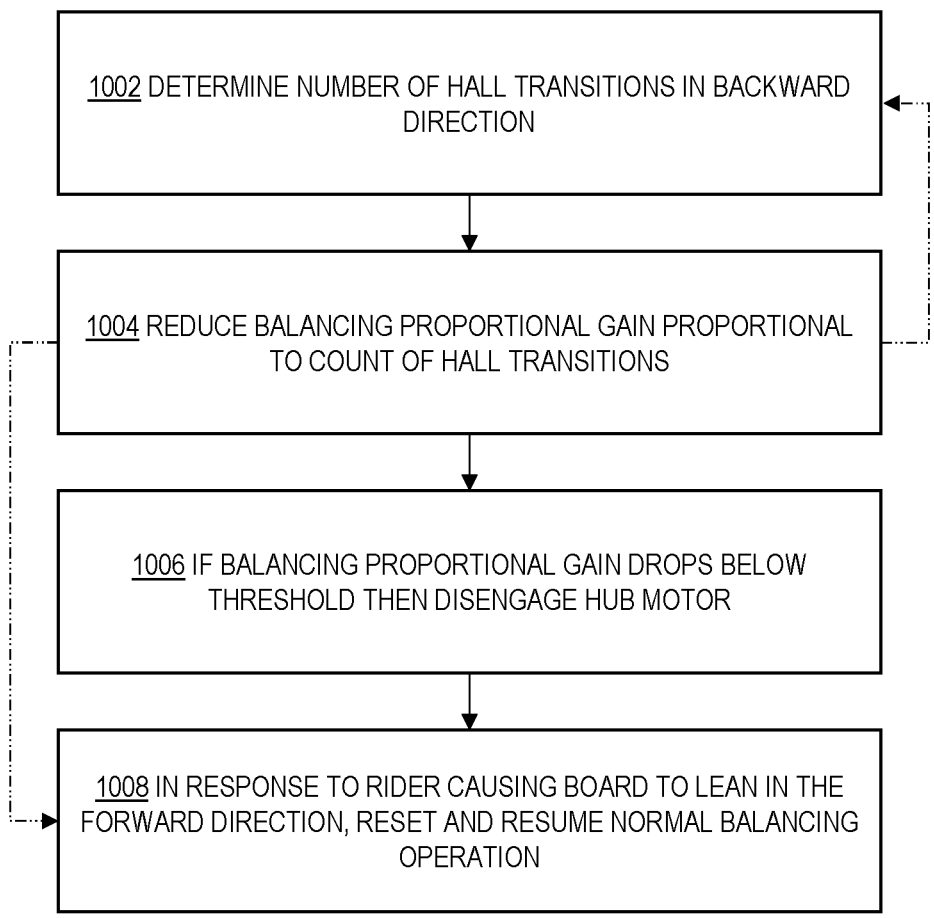
FIG. 33 is a flowchart depicting steps of a second illustrative method for controlling a one-wheeled vehicle during a rider dismount phase of operation.

FIG. 33 is a flowchart illustrating steps performed in method 1000, and may not recite the complete process or all steps of the method. Although various steps of method 1000 are described below and depicted in FIG. 33, the steps need not necessarily all be performed, and in some cases may be performed simultaneously or in a different order than the order shown.

At step 1002, the control system of the vehicle determines how far the wheel has turned in a reverse or backward direction, similar to step 902. For example, the system may count the number of transitions experienced by the Hall sensor(s) (e.g., Hall sensors 308), also referred to as Hall transitions, as the wheel turns in the backward direction. Any suitable method configured to determine motor and/or wheel rotation may be utilized in this step. For example, wheel and/or motor rotation may be determined by an estimator or encoder.

The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control). By determining the number of Hall transitions in the backward direction, the system has an indication of how far the motor/wheel has moved (e.g., in degrees).

Step 1004 of method 1000 includes adjusting (i.e., reducing) a proportional gain parameter related to balancing (a.k.a. a balancing proportional gain). As when adjusting the offset in step 904, this adjustment is proportional (or otherwise corresponds) to the number of Hall transitions determined in step 1002 (or other indicator of amount of backward rotation). As described above, reducing the proportional gain constant will result in a less responsive control system. Continuing to do so will result in a progressively less responsive system. In other words, the rider may experience the board response feeling progressively weaker until the tail of the board touches the ground.

Step 1006 of method 1000 includes comparing the balancing proportional gain parameter against another threshold (e.g., a gain threshold). If the proportional gain is less than the threshold, then the motor is disabled, e.g., by directing it to disengage or turn off. In some examples, the rotor may be locked, e.g., by applying a non-commutating current. Note that the PID loop may result in multiple passes, each of which includes repeating steps 1002 and 1004 and comparing the resulting gain to the threshold. When the motor is disabled, the rider is free to step off the board without concern for unexpected motion.

Step 1008 of method 1000 includes, in response to the rider causing the board to lean in the forward direction, resetting the proportional gain and resuming normal self-balancing operations. In some examples, the forward lean angle of step 1008 will reset the proportional gain at any point, including before obtaining the threshold and subsequent motor shutdown. In some examples, causing the board to lean in the forward direction may include bringing the board to level (i.e., zero degrees pitch).

Figure 34:
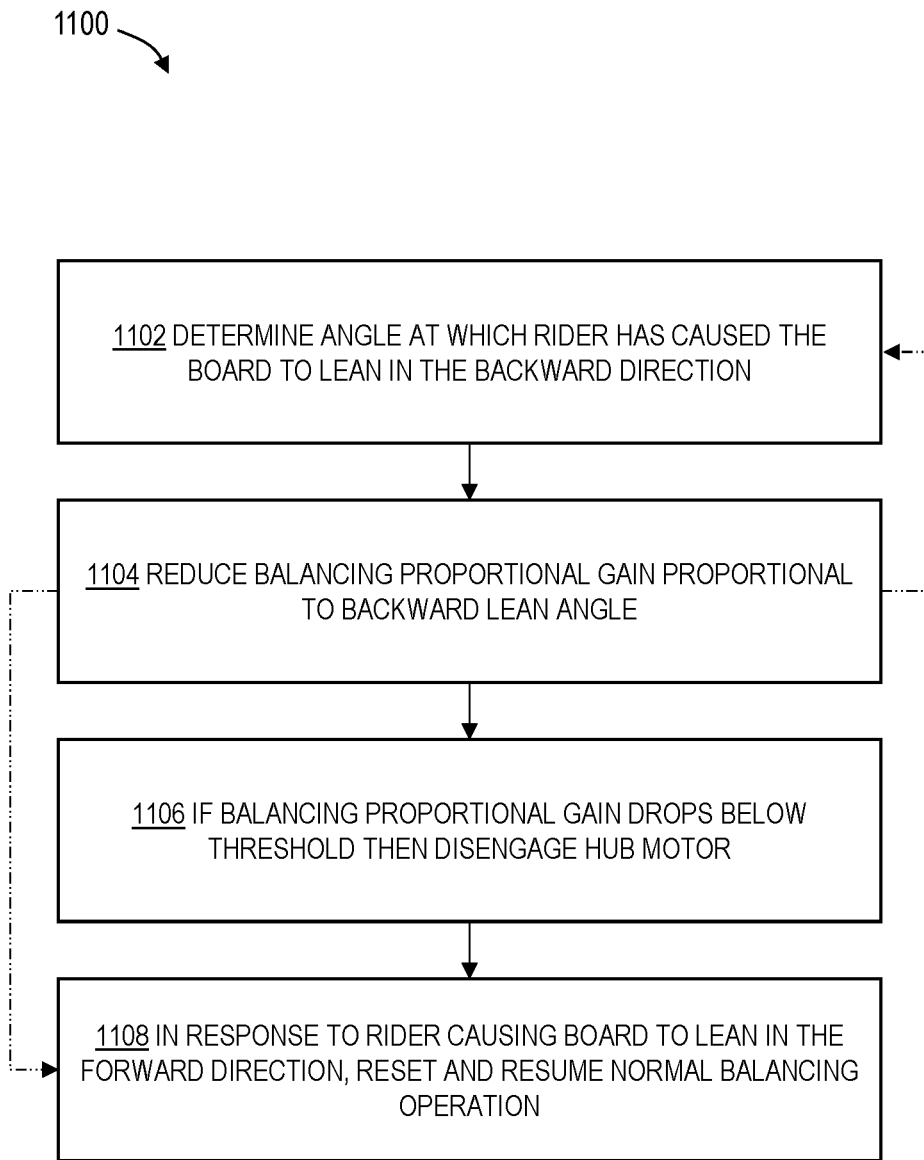
FIG. 34 is a flowchart depicting steps of a third illustrative method for controlling a one-wheeled vehicle during a rider dismount phase of operation.

FIG. 34 is a flowchart illustrating steps performed in method 1100, and may not recite the complete process or all steps of the method. Although various steps of method 1100 are described below and depicted in FIG. 34, the steps need not necessarily all be performed, and in some cases may be performed simultaneously or in a different order than the order shown.

At step 1102, the control system of the vehicle determines the board angle and recognizes that the board has been tilted in the backward or rearward direction (i.e., tail-down). The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control).

Step 1104 of method 1100 includes adjusting (i.e., reducing) a proportional gain parameter related to balancing (a.k.a. a balancing proportional gain). Similar to when adjusting the offset in steps 904 and 1004, this adjustment is proportional (or otherwise corresponds) to the board angle determined in step 1102. As described above, reducing the proportional gain constant will result in a less responsive control system. Continuing to do so will result in a progressively less responsive system. In this example, the rider may experience board control becoming weaker in the reverse direction, until the rider is able to force the tail down.

Step 1106 of method 1100 includes comparing the balancing proportional gain parameter against a threshold (e.g., a gain threshold). If the proportional gain is less than the threshold, then the motor is disabled, e.g., by directing it to disengage or turn off. In some examples, the rotor may be locked, e.g., by applying a non-commutating current. Note that the PID loop may result in multiple passes, each of which includes repeating steps 1102 and 1104 and comparing the resulting gain to the threshold. When the motor is disabled, the rider is free to step off the board without concern for unexpected motion.

Step 1108 of method 1100 includes, in response to the rider causing the board to lean in the forward direction, resetting the proportional gain and resuming normal self-balancing operations. In some examples, the forward lean angle of step 1108 will reset the proportional gain at any point, including before obtaining the threshold and subsequent motor shutdown. In some examples, causing the board to lean in the forward direction may include bringing the board to level (i.e., zero degrees pitch).

Figure 35:
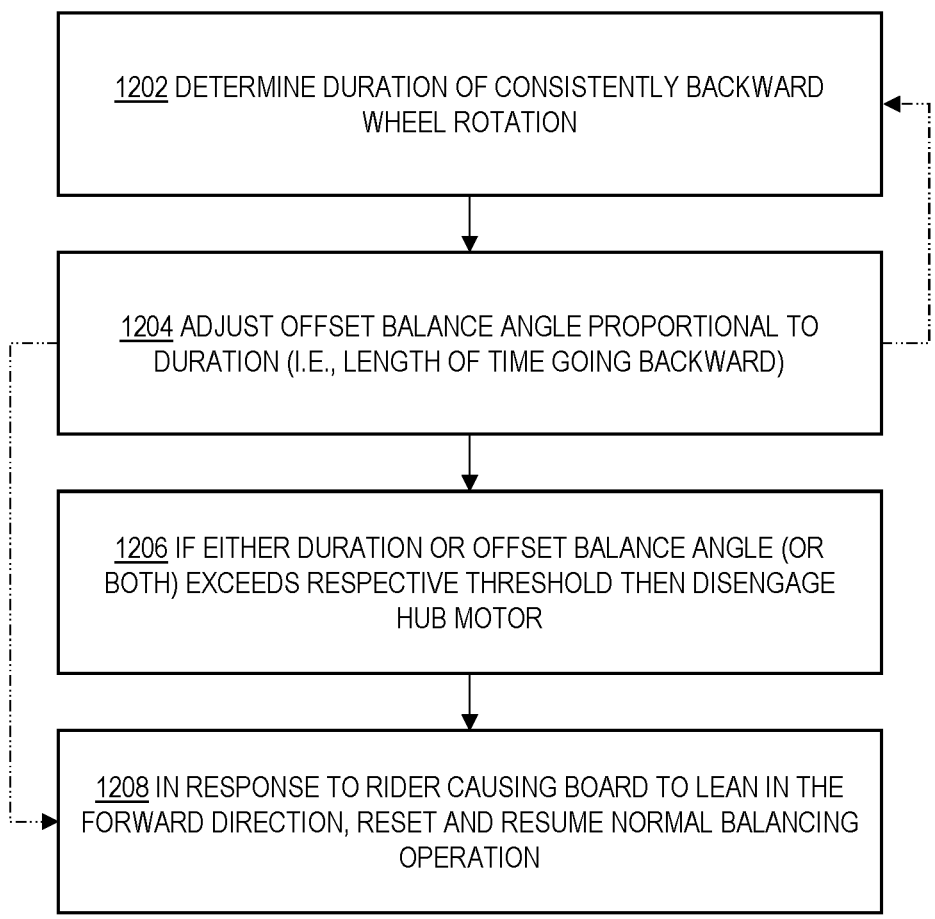
FIG. 35 is a flowchart depicting steps of a fourth illustrative method for controlling a one-wheeled vehicle during a rider dismount phase of operation.

FIG. 35 is a flowchart illustrating steps performed in method 1200, and may not recite the complete process or all steps of the method. Although various steps of method 1200 are described below and depicted in FIG. 35, the steps need not necessarily all be performed, and in some cases may be performed simultaneously or in a different order than the order shown.

At step 1202, the control system of the vehicle determines how long (e.g., in milliseconds) the rider has been rolling the board backward by recognizing that the Hall transitions are in the backward direction (or using any other suitable method) and measuring how long that continues. The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control).

Step 1204 of method 1200 includes adjusting (i.e., reducing) a balance angle offset parameter (a.k.a. offset balance angle) proportional (or otherwise corresponding) to the length of time (i.e., duration) going in the backward direction, determined in step 1202. This offset is in the backward direction. In other words, after the adjustment, the system may attempt to maintain balance at an angle where the "tail" end of the board is lower than the front end.

Step 1206 of method 1200 includes comparing the balance angle offset parameter against a first threshold (e.g., an offset threshold) and comparing the duration traveling in reverse to a second threshold (e.g., a duration threshold). If either or both of the offset parameter and the duration exceeds its respective threshold, then the motor is disabled, e.g., by directing it to disengage or turn off. In some examples, the rotor may be locked, e.g., by applying a non-commutating current. Note that the PID loop may result in multiple passes, each of which includes repeating steps 1202 and 1204 and comparing the resulting duration and offset to the thresholds. When the motor is disabled, the rider is free to step off the board without concern for unexpected motion.

Step 1208 of method 1200 includes, in response to the rider causing the board to lean in the forward direction, resetting the offset balance angle and resuming normal self-balancing operations. In some examples, the forward lean angle of step 1208 will reset the offset balance angle at any point, including before obtaining the threshold and subsequent motor shutdown. In some examples, causing the board to lean in the forward direction may include bringing the board to level (i.e., zero degrees pitch).

Figure 36:
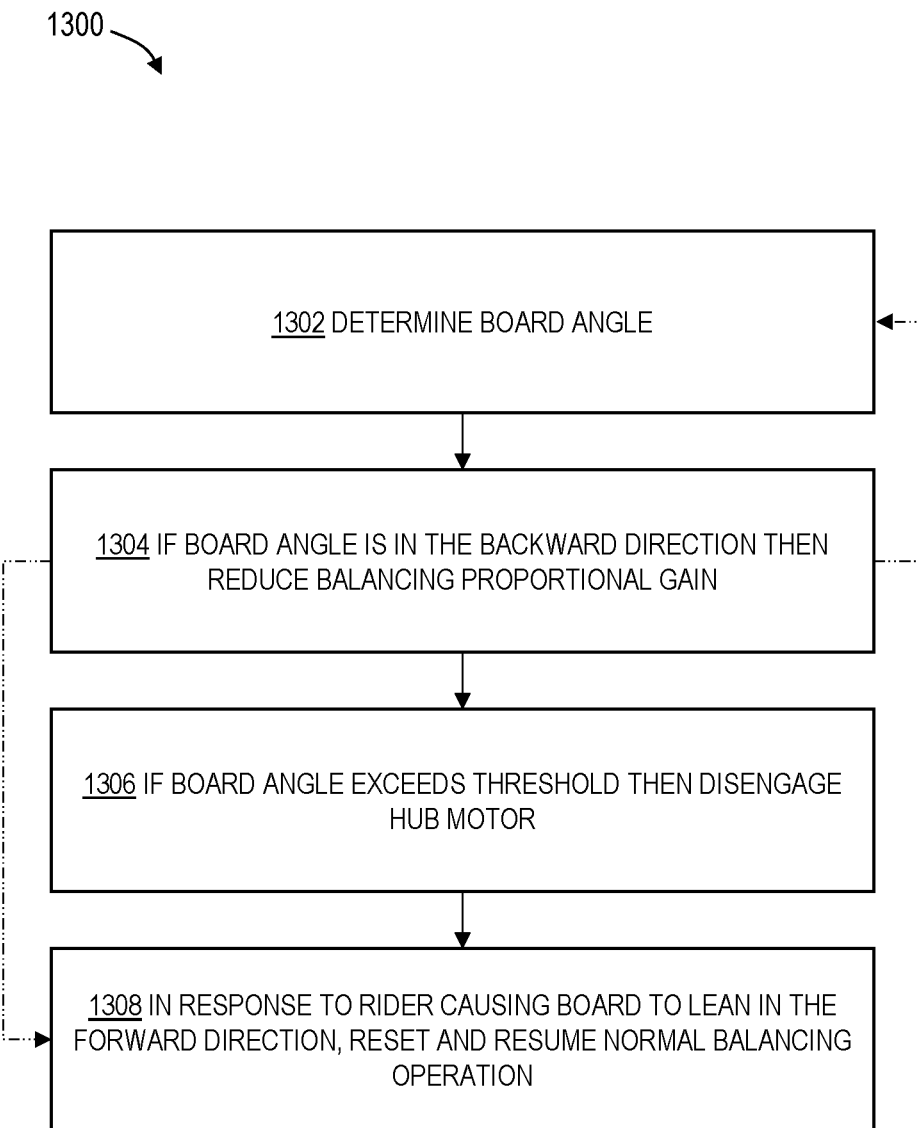
FIG. 36 is a flowchart depicting steps of a fifth illustrative method for controlling a one-wheeled vehicle during a rider dismount phase of operation.

FIG. 36 is a flowchart illustrating steps performed in method 1300, and may not recite the complete process or all steps of the method. Although various steps of method 1300 are described below and depicted in FIG. 36, the steps need not necessarily all be performed, and in some cases may be performed simultaneously or in a different order than the order shown.

At step 1302, the control system of the vehicle determines the board angle and determines whether the board angle corresponds to the backward or rearward direction (i.e., tail-down). The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control).

Step 1304 of method 1300 includes adjusting (i.e., reducing) a proportional gain parameter related to balancing (a.k.a. a balancing proportional gain). This adjustment is proportional (or otherwise corresponds) to the board angle determined in step 1302. As described above, reducing the proportional gain constant will result in a less responsive control system. Continuing to do so will result in a progressively less responsive system.

Step 1306 of method 1300 includes comparing the board angle against a threshold (e.g., a tilt threshold). If the board angle exceeds the threshold, then the motor is disabled, e.g., by directing it to disengage or turn off. In some examples, the rotor may be locked, e.g., by applying a non-commutating current. Note that the PID loop may result in multiple passes, each of which includes repeating steps 1302 and

1304 and comparing the board angle to the threshold. When the motor is disabled, the rider is free to step off the board without concern for unexpected motion.

Step 1308 of method 1300 includes, in response to the rider causing the board to lean in the forward direction, resetting the proportional gain and resuming normal self-balancing operations. In some examples, the forward lean angle of step 1308 will reset the proportional gain at any point, including before obtaining the threshold and subsequent motor shutdown. In some examples, causing the board to lean in the forward direction may include bringing the board to level (i.e., zero degrees pitch).

E. Illustrative Combinations and Additional Examples

This section describes additional aspects and features of the vehicles and control systems described herein, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A self-balancing electric vehicle comprising:
one or more wheels having a common axis of rotation;
a board having a first end and a second end, wherein the board is tiltable about the axis of the one or more wheels;
an electric hub motor configured to drive the one or more wheels;
a motor controller configured to receive orientation information indicating an orientation of the board and to cause the hub motor to propel the board based on the orientation information, wherein the motor controller includes processing logic configured to:
 receive direction information indicating a direction in which the hub motor is being commanded to propel the board;
 in response to the direction information indicating a first direction, hinder a responsiveness of the motor controller to the orientation information by automatically adjusting a first parameter of the motor controller; and
 in response to the first parameter reaching a first threshold, disabling the hub motor (e.g., locking the hub motor or turning the hub motor off).

A1. The vehicle of paragraph A0, wherein the direction information has a varying magnitude, and the first parameter is automatically adjusted proportionally with respect to the magnitude of the direction information.

A2. The vehicle of paragraph A0 or A1, wherein the vehicle has exactly one wheel, the board includes first and second deck portions each configured to receive a left or right foot of a rider oriented generally perpendicular to a direction of travel of the board, and the exactly one wheel is disposed between and extends above the first and second deck portions.

A3. The vehicle of any one of paragraphs A0 through A2, wherein a proportional-integral-derivative (PID) loop of the motor controller is configured to maintain a selected balance angle of the board, and the first parameter comprises a balance angle offset, such that adjusting the balance angle offset effectively causes the motor controller to attempt to maintain a different balance angle.

A4. The vehicle of any one of paragraphs A0 through A3, wherein a proportional-integral-derivative (PID) loop of the motor controller is configured to produce an output that is proportional to an error between an actual board angle and a reference angle, and the first parameter comprises a proportional gain constant, such that adjusting the proportional gain constant changes the responsiveness of the PID loop to the error.

A5. The vehicle of any one of paragraphs A0 through A4, wherein the processing logic is further configured to:
 determine a duration spent moving in the first direction; and
 in response to the duration reaching a duration threshold, disabling the hub motor (e.g., locking the hub motor or turning the hub motor off).

A6. The vehicle of any one of paragraphs A0 through A5, wherein the direction information comprises wheel rotation information.

A7. The vehicle of paragraph A6, wherein the one or more wheels comprise at least one Hall sensor, and the wheel rotation information comprises a count of Hall transitions received from the at least one Hall sensor.

A8. The vehicle of paragraph A7, wherein the first parameter is adjusted proportionally with respect to the count of Hall transitions.

A9. The vehicle of any one of paragraphs A0 through A8, wherein the direction information comprises a directional orientation of the board relative to a level orientation.

A10. The vehicle of any one of paragraphs A0 through A9, wherein the first direction is defined as backward and is user-selectable.

A11. The vehicle of any one of paragraphs A0 through A10, wherein the processing logic is further configured to:
 in response to the direction information indicating a second direction, reset the first parameter and resume balancing operation of the motor controller.

A12. The vehicle of paragraph A11, wherein the hub motor is maintained in a disabled state (e.g., an off or locked state) until board orientation is level.

B0. A control system for an electric vehicle, the control system comprising:
a hub motor configured to be coupled to a wheel of a vehicle;
a motor controller configured to receive orientation information indicating an orientation of a tiltable portion of the vehicle and to cause the hub motor to propel the vehicle based on the orientation information, wherein the motor controller includes processing logic configured to:
 receive direction information indicating a direction in which the hub motor is being commanded to propel the vehicle;
 in response to the direction information indicating a first direction, hinder a responsiveness of the motor controller to the orientation information by automatically adjusting a first parameter of the motor controller; and
 in response to the first parameter reaching a first threshold, disabling the hub motor (e.g., locking the hub motor or turning the hub motor off).

B1. The control system of B0, wherein the direction information has a varying magnitude, and the first parameter is automatically adjusted proportionally with respect to the magnitude of the direction information.

B2. The vehicle of paragraph B0 or B1, wherein a proportional-integral-derivative (PID) loop of the motor controller is configured to maintain a selected balance angle of the tiltable portion of the vehicle, and the first parameter comprises a balance angle offset, such that adjusting the balance angle offset effectively causes the motor controller to attempt to maintain a different balance angle.

B3. The vehicle of any one of paragraphs B0 through B2, wherein a proportional-integral-derivative (PID) loop of the motor controller is configured to produce an output that is proportional to an error between an actual angle of the tiltable portion and a reference angle, and the first parameter comprises a proportional gain constant, such that adjusting the proportional gain constant changes the responsiveness of the PID loop to the error.

B4. The vehicle of any one of paragraphs B0 through B3, wherein the processing logic is further configured to:
determine a duration spent moving in the first direction; and
in response to the duration reaching a duration threshold, disabling the hub motor (e.g., locking the hub motor or turning the hub motor off).

B5. The vehicle of any one of paragraphs B0 through B4, wherein the direction information comprises wheel rotation information.

B6. The vehicle of paragraph B5, wherein the wheel of the vehicle comprises at least one Hall sensor, and the wheel rotation information comprises a count of Hall transitions received from the at least one Hall sensor.

B7. The vehicle of paragraph B6, wherein the first parameter is adjusted proportionally with respect to the count of Hall transitions.

B8. The vehicle of any one of paragraphs B0 through B7, wherein the direction information comprises a directional orientation of the tiltable portion relative to a level orientation.

B9. The vehicle of claim any one of paragraphs B0 through B8, wherein the first direction is defined as backward and is user-selectable.

B10. The vehicle of any one of paragraphs B0 through B9, wherein the processing logic is further configured to:
in response to the direction information indicating a second direction, reset the first parameter and resume balancing operation of the motor controller.

B11. The vehicle of paragraph B10, wherein the hub motor is maintained in a disabled state (e.g., an off or locked state) until board orientation is level.

C0. An electric vehicle with one or more wheels driven by a permanent magnet motor, wherein the vehicle uses said motor for braking, comprising a control system in which a novel technique is implemented to dispose of the excess power when the vehicle is regenerating power to prevent over-voltage damage to the system. The novel technique disposes of energy by intentionally inefficiently operating the motor when the batteries are fully charged and cannot safely absorb more regenerated power.

C1. The technique of C0 may be used to prevent exceeding the battery cells' maximum charge rate in hard braking/downhill scenarios.

D0. A self-balancing vehicle having a motor that provides braking torque while descending downhill or stopping, having a control system that results in reduced risk of damaging the system or suddenly shutting down when the battery is near full charge. This allows the self-balancing vehicle to drive downhill at a faster speed and stop quickly with less risk of system damage and less risk of rider injury.

E0. In some embodiments, a permanent magnet motor (BLDC) control technique is provided that drives the motor in field-oriented control (FOC) allowing the flux and torque currents to be manipulated independently. The motor flux can be controlled in such a way as to reduce the back-EMF voltage, which reduces regenerated current. In addition to reducing the back-EMF, this process also wastes excess energy in the process by flowing current in the flux region of the motor, further disposing of the regenerated power.

F0. Control techniques described herein may drive the permanent magnet motor in such a way as to continue to have braking torque while reducing or eliminating the regenerated power, allowing the rider to continue downhill at a faster speed and/or stop quickly without raising the system voltage and damaging the control system and battery pack.

G0. Aspects of the present disclosure may also be relevant to systems with mechanical brakes (electric bicycles, motorcycles, cars, etc.) but which seek to use regenerative braking even when at a high state of charge.

H0. A control system for an electric vehicle, the control system comprising:
a power supply;
an electric motor coupled to the power supply; and
a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
determine whether a counter electromotive force (CEMF) of the electric motor exceeds a voltage of the power supply by comparing a bus voltage of the power supply to a voltage threshold; and
in response to the bus voltage being greater than the voltage threshold, weakening a motor flux of the electric motor and reducing the CEMF by automatically increasing the direct current.

H1. The control system of H0, wherein the processing logic of the motor controller is further configured to:
while the bus voltage is greater than the voltage threshold, automatically continue to increase the direct current of the motor; and
in response to the direct current reaching a direct current threshold, automatically stop increasing the direct current.

H2. The control system of any one of paragraphs H0 through H1, wherein automatically increasing the direct current comprises:
increasing a flux setpoint of the motor controller by a selected amount;
comparing an existing flux command to the flux setpoint; and
adjusting direct current to a higher of the existing flux command and the flux setpoint.

H3. The control system of any one of paragraphs H0 through H2, wherein the processing logic of the motor controller is further configured to: in response to the bus voltage being less than the voltage threshold and the direct current being greater than zero, reducing inefficiency of the motor by automatically reducing the direct current.

H4. The control system of H3, wherein automatically reducing the direct current comprises:
decreasing a flux setpoint of the motor controller by a selected amount;
comparing an existing flux command to the flux setpoint; and
adjusting direct current to a higher of the existing flux command and the flux setpoint.

H5. The control system of any one of paragraphs H0 through H4, wherein the power supply comprises a lithium ion battery.

H6. The control system of claim 1, wherein the electric motor comprises a hub motor configured to rotate a wheel of a vehicle.

Note: Paragraph labels beginning with the letter "I" are intentionally skipped, to avoid confusion with the number "1".

J0. An electric vehicle comprising:
one or more wheels;
an electric hub motor coupled to a power supply and configured to drive the one or more wheels;
a motor controller having a field-oriented control (FOC) scheme configured to control the electric hub motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
determine whether a counter electromotive force (CEMF) of the electric motor exceeds a voltage of the power supply by comparing a bus voltage of the power supply to a voltage threshold; and
in response to the bus voltage being greater than the voltage threshold, weakening a motor flux of the electric motor and reducing the CEMF by automatically increasing the direct current.

J1. The vehicle of J0, wherein the vehicle has exactly one wheel.

J2. The vehicle of J1, wherein the vehicle comprises a self-balancing electric skateboard, the skateboard comprising:
a board including first and second deck portions each configured to receive a left or right foot of a rider oriented generally perpendicular to a direction of travel of the board;
a wheel assembly including the exactly one wheel disposed between and extending above the first and second deck portions, wherein the electric hub motor is configured to rotate the wheel around an axle to propel the skateboard; and
at least one sensor configured to measure orientation information of the board;
wherein the motor controller is further configured to receive orientation information measured by the sensor and to cause the hub motor to propel the skateboard based on the orientation information.

J3. The vehicle of any one of paragraphs J0 through J2, wherein the processing logic of the motor controller is further configured to:
while the bus voltage is greater than the voltage threshold, automatically continue to increase the direct current of the motor; and
in response to the direct current reaching a direct current threshold, automatically stop increasing the direct current.

J4. The vehicle of any one of paragraphs J0 through J3, wherein automatically increasing the direct current comprises:
increasing a flux setpoint of the motor controller by a selected amount;
comparing an existing flux command to the flux setpoint; and
adjusting direct current to the higher of the existing flux command and the flux setpoint.

J5. The vehicle of any one of paragraphs J0 through J4, wherein the processing logic of the motor controller is further configured to: in response to the bus voltage being less than the voltage threshold and the direct current being greater than zero, reducing inefficiency of the motor by automatically reducing the direct current.

J6. The vehicle of J5, wherein automatically reducing the direct current comprises:
decreasing a flux setpoint of the motor controller by a selected amount;
comparing an existing flux command to the flux setpoint; and
adjusting direct current to a higher of the existing flux command and the flux setpoint.

K0. A method for preventing damage to a power supply of an electric vehicle during regenerative braking, the method comprising:
controlling an electric motor using a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current;
using processing logic of the motor controller to determine whether a counter electromotive force (CEMF) of the electric motor exceeds a voltage of the power supply; and
in response to the CEMF of the electric motor exceeding the voltage of the power supply, weakening a motor flux of the electric motor and reducing the CEMF by automatically increasing the direct current.

K1. The method of K0, wherein determining whether the CEMF of the electric motor exceeds the voltage of the power supply comprises comparing a bus voltage of the power supply to a voltage threshold.

K2. The method of K0 or K1, further comprising: while the CEMF of the electric motor exceeds the voltage of the power supply, automatically continuing to increase the direct current of the motor until the direct current reaches a direct current threshold.

K3. The method of any one of paragraphs K0 through K2, wherein automatically increasing the direct current comprises:
increasing a flux setpoint of the motor controller by a selected amount;
comparing an existing flux command to the flux setpoint; and
adjusting direct current to a higher of the existing flux command and the flux setpoint.

K4. The method of any one of paragraphs K0 through K3, further comprising: in response to the CEMF of the electric motor being below the voltage of the power supply and the direct current being greater than zero, reducing inefficiency of the motor by automatically reducing the direct current.

K5. The method K4, wherein automatically reducing the direct current comprises:
decreasing a flux setpoint of the motor controller by a selected amount;
comparing an existing flux command to the flux setpoint; and
adjusting direct current to a higher of the existing flux command and the flux setpoint. L0. A self-balancing electric vehicle comprising:
one or more wheels having a common axis of rotation;
a board having a first end and a second end, wherein the board is tiltable about the axis of the one or more wheels;
an electric hub motor coupled to a power supply and configured to drive the one or more wheels;

a motor controller configured to receive orientation information indicating an orientation of the board and to cause the hub motor to propel the board based on the orientation information; and a handle pivotably coupled to a frame of the board by a hinge, wherein the handle is transitionable between a stowed configuration, in which a distal end of a grip portion of the handle is adjacent the hub motor, and a deployed configuration, in which the distal end of the grip portion of the handle extends away from the hub motor.

L1. The vehicle of paragraph L0, wherein the handle extends generally from the hinge in a first direction, and the handle further comprises a latching tab extending from the hinge in a second direction, the latching tab being biased to hold the handle in the stowed configuration.

L2. The vehicle of paragraph L1, wherein the latching tab comprises a first magnet biased toward a portion of the board.

L3. The vehicle of paragraph L2, wherein the portion of the board comprises a second magnet configured to attract the first magnet.

L4. The vehicle of paragraph L1, wherein the portion of the board comprises a mounting block securing an axle of the hub motor to the frame of the vehicle.

L5. The vehicle of any one of paragraphs L0 through L4, wherein the handle comprises a curved grip portion.

L6. The vehicle of paragraph L5, wherein, when the handle is in the stowed configuration, a proximal end of the grip portion angles away from the hub motor and the distal end of the grip portion curves into an upright orientation.

L7. The vehicle of any one of paragraphs L0 through L6, wherein the handle is hingedly coupled to a mounting block disposed between an axle of the hub motor and at the frame of the board.

L8. The vehicle of any one of paragraphs L0 through L7, wherein the handle is electrically interlocked with the hub motor, such that the motor controller disables the hub motor when the handle is not in the stowed configuration.

L9. The vehicle of any one of paragraphs L0 through L8, wherein the handle comprises a metal overmolded with a resilient material.

L10. The vehicle of any one of paragraphs L0 through L9, wherein the distal end of the handle is configured to pivot downward.

L11. The vehicle of any one of paragraphs L0 through L10, wherein the vehicle includes exactly (i.e., only) one wheel.

L12. The vehicle of paragraph L11, wherein the wheel is disposed in an opening between the first end and the second end, and extends above and below the board.

M0. A self-balancing electric vehicle comprising:
one or more wheels having a common axis of rotation;
a board having a first end and a second end, wherein the board is tiltable about the axis of the one or more wheels;
an electric hub motor coupled to a power supply and configured to drive the one or more wheels;
a motor controller configured to receive orientation information indicating an orientation of the board and to cause the hub motor to propel the board based on the orientation information; and
a status indicator including a plurality of illuminators (e.g., an array of LEDs, e.g., a one-dimensional linear array of LEDs) viewable through a slot formed in an upper surface of the board.

M1. The vehicle of paragraph M0, wherein the status indicator is configured to indicate a status of the power supply.

M2. The vehicle of paragraph M1, wherein the power supply comprises a battery, and the status indicated is a charge level of the battery.

M3. The vehicle of any one of paragraphs M0 through M2, wherein the status indicator is configured to communicate information at least in part by emitting different colors of light from the illuminators.

M4. The vehicle of any one of paragraphs M0 through M3, wherein the status indicator is configured to communicate information at least in part by lighting different numbers of the illuminators.

M5. The vehicle of any one of paragraphs M0 through M4, wherein the slot is formed by corresponding notches in two different components of the board.

M6. The vehicle of paragraph M5, wherein a first one of the two different components is a foot pad of the vehicle.

M7. The vehicle of paragraph M5, wherein a second one of the two different components is a fender of the vehicle.

M8. The vehicle of any one of paragraphs M0 through M7, wherein the illuminators comprise light emitting diodes (LEDs).

M9. The vehicle of any one of paragraphs M0 through M8, wherein the illuminators are viewable through the slot via a light pipe.

M10. The vehicle of paragraph M9, wherein an end portion of the light pipe plugs the slot.

M11. The vehicle of paragraph M9, wherein the illuminators are disposed inside a housing of the motor controller.

M12. The vehicle of paragraph M11, wherein the controller housing comprises a transparent material.

M13. The vehicle of paragraph M12, wherein a base and a lid of the controller housing each consist essentially of the transparent material.

M14. The vehicle of paragraph M13, wherein portions of the housing are textured to inhibit transparency.

M15. The vehicle of any one of paragraphs M0 through M14, wherein the vehicle includes exactly (i.e., only) one wheel.

M15. The vehicle of paragraph M15, wherein the wheel is disposed in an opening between the first end and the second end, and extends above and below the board.

N0. A self-balancing electric vehicle comprising:
a board having a first deck portion and a second deck portion, and an opening between the first and second deck portions, wherein each of the first and second deck portions is configured to support a respective foot of a user oriented perpendicular to a direction of travel;
a wheel disposed in the opening between the first and second deck portions, wherein the board is tiltable about the axis of the wheel;
an electric hub motor configured to drive the wheel;
a motor controller configured to receive orientation information indicating an orientation of the board and to cause the hub motor to propel the board based on the orientation information; and
a fender removably coupled to a frame of the board and spanning the opening between the deck portions, wherein the fender includes an arched portion covering an upper surface of the wheel and a peripheral flange disposed on top of the frame and extending completely around a periphery of the opening.

N1. The vehicle of paragraph N0, wherein the fender includes a skirt portion extending downward to cover an opening at an inboard end of one of the deck portions.

N2. The vehicle of paragraph N0 or N1, wherein the fender further comprises a protruding ridge, and the protruding ridge is configured to snap into a corresponding channel in the frame.

N3. The vehicle of any one of paragraphs N0 through N2, wherein the wheel is a first wheel, the vehicle further comprising at least a second wheel having a common axis of rotation with the first wheel.

N3. The vehicle of any one of paragraphs N0 through N3, wherein edges of the arched portion of the fender extend downward to partially cover lateral sides of the wheel.

Note: Paragraph labels beginning with the letter "O" are intentionally skipped, to avoid confusion with the number "0".

P0. A self-balancing electric vehicle comprising:
a board having a first deck portion and a second deck portion, and an opening between the first and second deck portions, wherein each of the first and second deck portions is configured to support a respective foot of a user oriented perpendicular to a direction of travel;
a wheel disposed in the opening between the first and second deck portions, wherein the board is tiltable about an axis of the wheel;
an hub motor configured to drive the wheel; and
a motor controller configured to receive orientation information indicating an orientation of the board and to cause the hub motor to propel the board based on the orientation information.

P1. The vehicle of paragraph P0, further comprising: a handle pivotably coupled to a frame of the board, wherein the handle is transitionable between a stowed configuration, in which a distal end of a grip portion of the handle is adjacent the hub motor, and a deployed configuration, in which the distal end of the grip portion of the handle extends away from the hub motor.

P2. The vehicle of paragraph P0 or P1, further comprising a fender coupled to a frame of the board and spanning the opening between the deck portions, wherein the fender includes an arched portion covering an upper surface of the wheel and a peripheral flange disposed on top of the frame and extending around a complete periphery of the opening.

P3. The vehicle of any one of paragraphs P0 through P2, further comprising a status indicator including a plurality of illuminators viewable through a slot formed in an upper surface of the board.

P4. The vehicle of any one of paragraphs P0 through P3, further comprising a control system, the control system comprising:
a power supply coupled to the electric motor;
wherein the motor controller has a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
determine whether a counter electromotive force (CEMF) of the electric motor exceeds a voltage of the power supply by comparing a bus voltage of the power supply to a voltage threshold; and
in response to the bus voltage being greater than the voltage threshold, weakening a motor flux of the electric motor and reducing the CEMF by automatically increasing the direct current.

P5. A method for preventing damage to a power supply of an electric vehicle according to any one of paragraphs P0 through P3 during regenerative braking, the method comprising:
controlling the electric motor using a field-oriented control (FOC) scheme of the motor controller wherein the FOC scheme is configured to control the electric motor by manipulating a direct current aligned with a rotating rotor flux angle and a quadrature current defined at ninety degrees from the rotating rotor flux angle, wherein manipulation of the direct current is independent of manipulation of the quadrature current;
using processing logic of the motor controller to determine whether a counter electromotive force (CEMF) of the electric motor exceeds a voltage of the power supply; and
in response to the CEMF of the electric motor exceeding the voltage of the power supply, weakening a motor flux of the electric motor and reducing the CEMF by automatically increasing the direct current.

P6. The vehicle of any one of paragraphs P0 through P5, wherein the motor controller includes processing logic configured to:
receive direction information indicating a direction in which the hub motor is being commanded to propel the board;
in response to the direction information indicating a first direction, hinder a responsiveness of the motor controller to the orientation information by automatically adjusting a first parameter of the motor controller; and
in response to the first parameter reaching a first threshold, disabling the hub motor (e.g., locking the hub motor or turning the hub motor off).

P7. The vehicle of any one of paragraphs P0 through P5, wherein the motor controller includes processing logic configured to:
receive direction information indicating a direction in which the hub motor is being commanded to propel the vehicle;
in response to the direction information indicating a first direction, hinder a responsiveness of the motor controller to the orientation information by automatically adjusting a first parameter of the motor controller; and
in response to the first parameter reaching a first threshold, disabling the hub motor (e.g., locking the hub motor or turning the hub motor off).

Advantages, Features, and Benefits

The different embodiments and examples of the self-stabilizing (e.g., self-balancing) one-wheeled electric vehicle (e.g., skateboard) described herein provide several advantages over known solutions. For example, illustrative embodiments and examples described herein provide an intuitive method for the rider to dismount, enhancing the riding experience as well as safety.

Additionally, and among other benefits, illustrative embodiments and examples described herein respond in a proportional manner, such that the rider can control the dismount process more predictably.

Additionally, and among other benefits, illustrative embodiments and examples described herein allow disabling of the hub motor using aspects of the normal-operation control method of tilting the board, such that additional buttons or user controls are unnecessary.

Additionally, and among other benefits, illustrative embodiments and examples described herein resolve potentially damaging over-voltage situations by prevent overvoltage damage when the vehicle is regenerating power, redirecting energy by manipulating the flux current independently from the quadrature current, providing a better rider experience while also preventing damage to the battery.

Additionally, and among other benefits, illustrative embodiments and examples described herein provide a convenient carrying handle for the board, securely stowable when riding and easy to deploy.

Additionally, and among other benefits, illustrative embodiments and examples described herein allow a rider to view battery status from above the board, by way of an illuminated status indicator viewable through a slot in the board.

Additionally, and among other benefits, illustrative embodiments and examples described herein include a solid light pipe that plugs the slot while transmitting light from the status indicator's illuminators to a viewable location, thereby preventing incursion of liquids and debris into an interior of the board.

Additionally, and among other benefits, illustrative embodiments and examples described herein include an interchangeable fender system, such that in all cases a periphery around the tire is partially covered in an aesthetic manner.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A self-balancing electric vehicle comprising:
a single wheel having an axis of rotation;
a board configured to be tiltable about the axis of the single wheel;
an electric hub motor coupled to a power supply and configured to drive the single wheel;
a motor controller configured to receive orientation information indicating an orientation of the board and to cause the hub motor to propel the board based on the orientation information; and
a status indicator disposed in an upper surface of the board and configured to indicate a status of the power supply;
wherein the status indicator comprises one or more illuminators configured to be viewable through a slot in the board, via a light pipe; and
wherein an upper portion of the light pipe plugs the slot.

2. The vehicle of claim 1, wherein the status indicator is disposed between a first foot pad of the board and the single wheel.

3. The vehicle of claim 1, wherein the one or more illuminators are disposed in a housing of the motor controller.

4. The vehicle of claim 3, wherein the housing of the motor controller comprises a clear polycarbonate material, and portions of the housing are textured to inhibit transparency.

5. A self-balancing electric vehicle comprising:
one or more wheels having a common axis of rotation;
a board having a first end and a second end, wherein the board is tiltable about the axis of the one or more wheels;
an electric hub motor coupled to a power supply and configured to drive the one or more wheels;
a motor controller configured to receive orientation information indicating an orientation of the board and to cause the hub motor to propel the board based on the orientation information; and
a power supply status indicator including a plurality of illuminators viewable through a slot in an upper surface of the board;
wherein a perimeter of the slot comprises corresponding notches in two different components of the vehicle.

6. The vehicle of claim 5, wherein one of the two different components is a foot pad of the vehicle.

7. The vehicle of claim 5, wherein the illuminators are viewable through the slot via a light pipe.

8. The vehicle of claim 7, wherein a portion of the light pipe plugs the slot.

9. The vehicle of claim 5, wherein the illuminators are disposed inside a housing of the motor controller.

10. The vehicle of claim 9, wherein the housing of the motor controller comprises a clear polycarbonate, and portions of the housing are textured to inhibit transparency.

11. The vehicle of claim 5, wherein the one or more wheels of the vehicle consist of only one wheel, and wherein the one wheel is disposed in an opening between the first end and the second end of the board, and extends above and below the board.

12. A self-balancing electric vehicle comprising:
a single wheel having an axis of rotation;
a board having a first end and a second end, wherein the board is tiltable about the axis of the single wheel;
an electric hub motor coupled to a power supply and configured to drive the single wheel;
a motor controller configured to receive orientation information indicating an orientation of the board and to cause the hub motor to propel the board based on the orientation information; and
a status indicator disposed in an upper surface of the board, wherein the status indicator comprises at least one illuminator configured to be visible at the upper surface via a light pipe;
wherein the at least one illuminator is disposed inside a housing of the motor controller, the housing of the motor controller comprising a lid; and
wherein the lid and the light pipe are formed as a single piece.

13. The vehicle of claim 12, wherein the status indicator is configured to indicate a status of the power supply.

14. The vehicle of claim 12, wherein the housing of the motor controller comprises a clear polycarbonate material.

15. The vehicle of claim 14, wherein portions of the housing are textured to inhibit transparency.

16. The vehicle of claim 1, wherein a perimeter of the slot comprises corresponding notches in two different components of the vehicle.

17. The vehicle of claim 3, wherein the housing of the motor controller comprises a lid, and wherein the lid and the light pipe are formed as a single piece.

18. The vehicle of claim 9, wherein the illuminators are viewable through the slot via a light pipe, and wherein the housing of the motor controller comprises a lid formed as a single piece with the light pipe.

19. The vehicle of claim 12, wherein a portion of the light pipe plugs a slot in the board, such that the at least one illuminator is viewable through the slot.

20. The vehicle of claim 19, wherein a perimeter of the slot comprises corresponding notches in two different components of the vehicle.

* * * * *